United States Patent
Humphreys et al.

(10) Patent No.: US 7,873,558 B1
(45) Date of Patent: *Jan. 18, 2011

(54) METHODS AND APPARATUS FOR DETERMINING AN EFFECT OF A SELECTION

(75) Inventors: H. Brett Humphreys, Hastings-on-Hudson, NY (US); David Shimko, New York, NY (US)

(73) Assignee: Asset Deployment LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/343,394

(22) Filed: Dec. 23, 2008

Related U.S. Application Data

(63) Continuation-in-part of application No. 11/560,586, filed on Nov. 16, 2006.

(51) Int. Cl.
*G06Q 40/00* (2006.01)
(52) U.S. Cl. .................................................. 705/36 R
(58) Field of Classification Search ................ 705/36 R
See application file for complete search history.

(56) References Cited

U.S. PATENT DOCUMENTS 5,991,745 A * 11/1999 Kiritz ........................ 705/38
6,460,021 B1 * 10/2002 Kirksey ...................... 705/35
2002/0077961 A1 * 6/2002 Eckert et al. ................. 705/37
2004/0054613 A1 * 3/2004 Dokken ...................... 705/36
2006/0248004 A1 * 11/2006 Griffiths ..................... 705/38
2008/0027806 A1 * 1/2008 Martine et al. ............... 705/14
2008/0097797 A1 * 4/2008 Morris et al. ................. 705/4

OTHER PUBLICATIONS

Cummings, J.D.: Securitization of Life Insurance Assets and Liabilities, Th Wharton Financial Institutions Center, Apr. 2004, pp. 1-66.*
Murray, Joh C.: Assignment of an LLC Member's Rights to Profits, Losses, and Distributions: A Violation of the Due-on-Sale, Clause?, First American Title, 2004, pp. 1-3.*

* cited by examiner

*Primary Examiner*—Hani Kazimi
*Assistant Examiner*—Bijendra K Shrestha
(74) *Attorney, Agent, or Firm*—Jones Day; Brett Lovejoy; Arrienne Lezak

(57) ABSTRACT

A method, computer program product, and system are disclosed. The method comprises receiving a selection of a first object. The first object is associated with a value, and receiving the first object is controlled by one or more parameters. The first object is used to select a second object, thereby affecting the state of the first object. The second object is obtained using the first object. An effect the obtaining of the second object has on the first object is determined, and the value associated with the first object is revised based on the effect.

57 Claims, 7 Drawing Sheets

METHODS AND APPARATUS FOR DETERMINING AN EFFECT OF A SELECTION

CROSS-REFERENCE TO RELATED APPLICATION

This application is a continuation-in-part of U.S. patent application Ser. No. 11/560,586, filed Nov. 16, 2006, which is hereby incorporated by reference in its entirety herein.

FIELD OF THE INVENTION

Systems, methods, and computer readable media for determining an effect of a selection are provided.

SUMMARY

A method, computer program product, and system are disclosed. The method comprises receiving a selection of a first object associated with a value. The first object, which is controlled by one or more parameters, is used to select a second object, thereby affecting the state of the first object. The second object is obtained using the first object. An effect the obtaining of the second object has on the first object is determined, and the value associated with the first object is revised based on the effect.

The one or more parameters can limit the value by a maximum term of use. The first object can be one object in a plurality of selected objects used to obtain the second object. The selection of the second object can affect the state of each selected object in the plurality of selected objects. The first object can be used to obtain a plurality of second objects. The effect can be a detriment and the value is revised according to the detriment. Alternatively, the effect can be a benefit and the value is revised according to the benefit.

BRIEF DESCRIPTION OF THE DRAWINGS

The above and other objects and advantages of the invention will be apparent upon consideration of the following detailed description, taken in conjunction with the accompanying drawings, in which like reference numerals refer to corresponding parts throughout, and in which.

DETAILED DESCRIPTION

Figure 1:
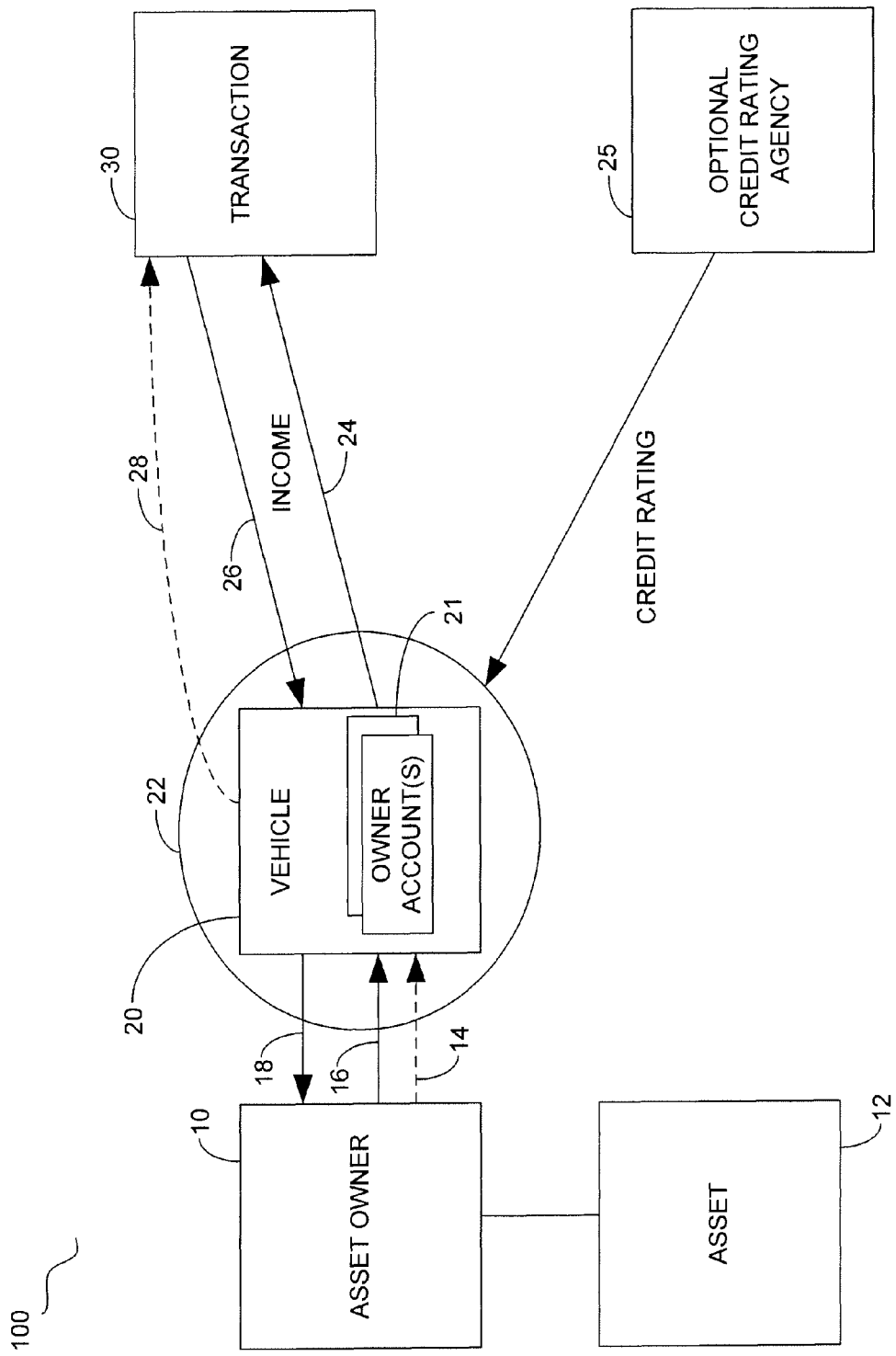
FIG. 1 is a schematic diagram of a first embodiment.

Systems, methods, and computer readable media for determining an effect of a selection of are provided.

Optional Methods for Visualizing Information

In some embodiments, a static graphic representation of an object can be used to convey information about the object. In some embodiments the static graphic representation can be a bitmapped or pixmapped image. As used herein, a bitmap or pixmap is a type of memory organization or image file format or data structure used to store a digital image. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. One example of a bitmap is a specific format used in WINDOWS® that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP).

In addition to such uncompressed formats, as used herein, the term bitmap and pixmap refers to compressed formats. Examples of such bitmap formats include, but are not limited to, formats such as JPEG, TIFF, PNG, and GIF, to name just a few, in which the bitmap image, as opposed to the vector image, is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, *Computer Graphics: Principles and Practice, Addison-Wesley Professional*, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel ($2^n$ colors) bitmap, in bytes, can be calculated as: size≈width×height×n/8, where height and width are given in pixels. In this formula, header size and color palette size, if any, are not included. Due to effects of row padding to align each row start to a storage unit boundary such as a word, additional bytes may be needed.

Optional Compression of Information

In 1911, Professor Lane Cooper published a concordance of William Wordsworth's poetry so that scholars could readily locate words in which they were interested. The 1,136-page tome lists all 211,000 nontrivial words in the poet's words, from Aäliza to Zutphen's, yet remarkably, it took less than seven months to construct. The task was completed so quickly because it was undertaken by a highly organized team of 67 people using three-by-five inch cards, scissors, glue, and stamps. Witten et al., 1994, *Managing Gigabytes: Compressing and Indexing Documents and Images*, p. 1, Van Nostrand Reinhold, New York.

In the present day, it is possible to store vast amounts of information in relatively little space and to perform full-text retrieval on such information. Such information may include files that contain any combination of objects such as text, images, sound, and video. The storage of vast quantities of information has given rise to many computer programs that can locate information responsive to a user query. Such programs can be used to find, store, and retrieve information about objects that is stored in one or more databases in compressed or uncompressed form.

Many compression methods are available to compress information about objects in a database. They range from numerous ad-hoc techniques to more principled methods that can give very good compression. One of the earliest and best-known methods of text compression for computer storage and telecommunications is Huffman coding, invented in the early fifties. This uses the same principle as Morse code: common symbols—conventionally, characters—are coded in just a few bits, while rare ones have longer codewords. In the late seventies—Ziv-Lempel compression and arithmetic coding (e.g., prediction by partial matching) made higher compression rates possible. Both these ideas achieve their power through the use of adaptive compression which is a kind of dynamic coding where the input is compressed relative to a mode that is constructed from the text that has just been coded.

By basing the model on what has been seen so far, adaptive compression methods combine two key virtues: they are able to encode in a single pass through the input file, and they are able to compress a wide variety of inputs effectively rather than being fine-tuned for one particular type of data such as English text. Early implementations of character-level Huffman coding were typically able to compress English text to about five bits per character. Ziv-Lempel methods reduce this to fewer than four bits per character. Methods based on arithmetic coding can further improve the compression to just over two bits per character. Although present compression techniques have not substantially improved on compression of about two bits per character for general English text, improvements continue to be made in processor and memory utilization during compression.

Although the use of compression techniques discussed above can save much space, it does not help with the question of how the information should be organized so that queries can be resolved and relevant portion of the data located and extracted. Indexes, much like Professor Lane Cooper's concordance of William Wordsworth's poetry, are used for such purposes. Indexes can range in detail from a few key terms in a document, or collection of documents, to a complete concordance of every word in a document, or collection of documents, showing each context in which it was used. An alphabetically ordered index can be searched very quickly using a binary search. Each probe into the index halves the number of potential locations for the target of the search. The computer's equivalent of the concordance entry is usually too large to store in main memory, so an access to secondary storage (usually disk) is required to obtain the list of references. Then the references must be retrieved from the disk. Depending on the type of disk, how local it is to the computer, and the extent of mechanical movement that is required in devices such as jukebox arrays, this might take anything from a few milliseconds to a few seconds. Witten et al., 1994, *Managing Gigabytes: Compressing and Indexing Documents and Images*, Chapter 2, Van Nostrand Reinhold, New York.

An object database (e.g., collection of information about objects, their value, or parameters associated with such objects) can be treated as a set of separate objects, each described by a set of representative terms, or simply terms. An object index for the object database identifies objects within the object database that contain specified terms, combinations of specified terms, or other features that may be relevant to a set of query terms. Information about an object is this context is thus a unit of text that is returned in response to queries. The granularity of the index, the resolution to which term locations are recorded within each object (e.g., within information about such objects), can be taken to be an absolute address, to the word level, to the sentence level, to the paragraph level, or to some other granularity. Moreover, the representative terms for objects can be deemed to be each of the words that appear in an object (e.g., information that describes the object). Alternatively, such words can be transformed in some way before inclusion in the index (e.g., case-folding in which all words are reduced to the same case, reduction of words to morphological roots by removal of suffixes and other modifiers, and/or the omission of stop words such as "a" and "it").

One form of index that can be used to index an object database is an inverted index. An inverted index contains, for each term in the lexicon, an inverted field entry that stores a list of pointers to all occurrences of that term, where each pointer is, in effect, the number of an object in which that term appears (e.g., in the information stored about the objects). The inverted field entry is also sometimes known as a posting list, and the pointers as postings. This produces a tightly packed increasing or equivalent integer sequence for the purpose of index storage and table offset values. For the purpose of table offset values the structure preferably supports direct access.

To illustrate an inverted index, consider the traditional children's nursery rhyme of Table 1, with each line taken to be a document for indexing purposes.

TABLE 1

Example text; each line is considered a document

| Document | Text |
|---|---|
| 1 | Peas porridge hot, peas porridge cold |
| 2 | Peas porridge in the pot, |
| 3 | Nine days old. |
| 4 | Some like it hot, some like it cold |
| 5 | Some like it in the pot |
| 6 | Nine days old. |

The inverted index generated from this text is shown in Table 2, where the terms have been cased-folded, but with no stemming and no words stopped. Because of the unusual nature of the example, each word appears in exactly two of the lines. This would not normally be the case, and in general, inverted field entries are of widely differing lengths.

TABLE 2

Inverted index for text of Table 1

| Number | Term | Documents |
|---|---|---|
| 1 | Cold | 1, 4 |
| 2 | Days | 3, 6 |
| 3 | Hot | 1, 4 |
| 4 | In | 2, 5 |
| 5 | It | 4, 5 |
| 6 | Like | 4, 5 |
| 7 | Nine | 3, 6 |

TABLE 2-continued

Inverted index for text of Table 1

| Number | Term | Documents |
|--------|----------|-----------|
| 8 | Old | 3, 6 |
| 9 | Peas | 1, 2 |
| 10 | Porridge | 1, 2 |
| 11 | Pot | 2, 5 |
| 12 | Some | 4, 5 |
| 13 | The | 2, 5 |

Note that in Table 1, the first column is not necessary because it can be inferred from the row number of the inverted index. It is present merely for illustrative purposes. A query involving a single term is answered by retrieving every object that is referenced in the inverted field entry in the inverted index that corresponds to the term. For conjunctive Boolean queries of the form "term AND term AND . . . AND term," the intersection of the terms' inverted field entries is formed. For disjunction, where the operator is OR, the union is taken; and for negation using NOT, the complement is taken. As represented in the far right hand column of Table 2, the inverted field entries are typically stored in order of increasing document number, so that these various merging operations can be performed in a time that is linear in the size of the inverted field entries. As an example, to locate documents containing "some AND hot" in the text of Table 1, the inverted field entries for the terms "some" and "hot" ($\langle 4,5]\rangle$ and $\langle 1,4]\rangle$ respectively) are intersected, yielding the documents that they have in common—in this case the document $\langle 4]\rangle$. This document is then located in Table 1, and displayed.

Uncompressed inverted indexes such as Table 2 can consume considerable space, and might occupy 50 percent to 100 percent of the space of the documents that are indexed. For example, in typical English prose the average word contains about five characters, and each word is normally followed by one or two bytes of white-space or punctuation characters. Storing the location of such words in memory as 32-bit memory addresses, and supposing that there is no duplication of words within documents, there might thus be four bytes of inverted field entry for every six bytes of text. More generally, for a text of N documents and in index containing f pointers, the total space required is $f \cdot \lceil \log N \rceil$ bits, provided that pointers are stored in a minimal number of bits, where the notation $\lceil x \rceil$ indicates the smallest integer greater than or equal to x (hence $\lceil 3.3 \rceil$ equals 4). The omission of a set of stop words from the inverted index yields significant savings in an uncompressed inverted index, since the common terms usually account for a sizable fraction of the total word occurrences.

The size of an inverted index can be reduced considerably by compression. As noted by Table 2, such compression is based upon the observation that each inverted field entry is an ascending (or descending) sequence of integers. For example, suppose that the term elephant appears in eight documents in a document collection—documents 3, 5, 20, 21, 23, 76, 77, and 78 of the document collection. This term can be described in the inverted index by the inverted field entry:

$\langle$elephant;8;[3,5,20,21,23,76,77,78]]$\rangle$.

More generally, this stores the term t, optionally, the number of documents $f_t$, in which the term appears, and then a list of $f_t$ document numbers (the inverted field entry):

$\langle t; f_t; [d_1, d_2, \ldots, d_{f_t}]]\rangle$, where $d_k < d_{k+1}$. Because the list of document numbers within each inverted field entry is in ascending order, and all processing is sequential from the beginning of the entry, the list can be stored as an initial address followed by a list of gaps, the differences $d_{k+1} - d_k$. That is, they entry for the term above could just as easily be stored as:

$\langle$elephant; 8; [3, 2, 15, 1, 2, 53, 1, 1]]$\rangle$.

No information has been lost, since the original document numbers can always be obtained by calculating sums of the gaps. Considering each inverted field entry as a list of gap sizes, the sum of which can be N at most, allows improved representation, and it is possible to code inverted field entries of an inverted index using on average substantially fewer than $\lceil \log N \rceil$ bits per pointer. Several specific models have been proposed for describing the probability distributions of gap sizes for the purpose of improved inverted index compression. These specific models include global methods, in which every inverted field entry is compressed using the same common model, and local methods, where the compression model for each term's inverted field entry is adjusted according to some stored parameter, usually the frequency of the term. An example of a global method is to use variable-length representations of gap length in which more common gap lengths are coded with smaller codes than less common gap lengths.

For example, in instances where small gap values are considered more likely than large ones the unary code can be used. In this code, an integer $x \geq 1$ is coded as x−1 one bits followed by a zero bit. For example the code for a gap of 1 is coded as 0, a gap of 2 is coded as 10, a gap of 3 is coded as 110, and a gap of four is coded as 1110. Other forms of coding include the γ code, which represents the number x as a unary code for $1 + \lfloor \log x \rfloor$ followed by a code of $\lfloor \log x \rfloor$ bits that represents the value of $x - 2^{\lfloor \log x \rfloor}$ in binary, where $\lfloor x \rfloor$ denotes the greatest integer less than or equal to x. The unary part specifies how many bits are required to code x, and then the binary part actually codes x in that many bits. For example, consider x=9. Then $\lfloor \log x \rfloor = 3$, and so 4=1+3 is coded in unary code (code 1110) followed by 1=9−8 as a 3-bit number (code 001), which combine to give a codeword of 1110001. Other global methods for coding gap lengths are known. Furthermore, local methods for coding gaps, such as the local Bernoulli model, local hyperbolic model, and the local "observed frequency model" have been used for inverted file compression. See, for example Witten et al., 1994, *Managing Gigabytes: Compressing and Indexing Documents and Images*, Chapter 3, Van Nostrand Reinhold, New York; Bell et al., 1993, "Data Compression in Full-text Retrieval Systems," Journal of the American Society for Information Science 44(9), 508-531.

While inverted index compression based upon the exploitation of gap lengths in inverted field entries is useful, such compression has the drawback of not providing direct access to the documents. Rather, such methods require forward sequential access. For example, to determine the value of the seventh document in the inverted field entry:

$\langle$elephant; 8; [3, 2, 15, 1, 2, 53, 1, 1]]$\rangle$.

it is necessary to sum all the gap entries beginning from the start of the list of entries in the inverted field entry. Of course, the list of document numbers can be broken up into segments and the value of the starting point given for each segment so that it is not necessary to sum the gap lengths from the beginning of the list of entries. However, such a mechanism reduces the overall compression of the inverted field entries and still does not provide direct or near direct access to individual entries.

In addition to forming the basis of an inverted index as discussed above, sequences of increasing or equivalent integers find many other applications in computer science. For example, they can be used to store offsets to the start of each record in a collection of variable size records stored in memory. In fact, they can be used to store offsets to any position of interest (e.g., the address of a field within a record) in any record in a collection of records, where such records are variable or fixed in size, stored in memory.

Pointers have significant utility. For example, in the case of compressed records, since it is possible for each record to be compressed by a different amount, there is no guarantee that such records have a fixed size, even in the unlikely event that such records were of fixed size prior to compression. Therefore it is not possible to directly access such records without an associated pointer table that keeps track of the start address (or some other fixed reference address) of each record.

Offset tables used for storing offsets (pointers) to variable sized data are typically stored as simple fixed size values. As long as these offsets are small relative to the size of the data this cost is simply factored into the total cost. At the fairly typical 8-byte per record and given that variable size data records themselves are somewhat atypical, overall this expense is generally ignored. Seldom would any data records have multiple subfields also directly indexed as the additional expense is pretty high. Generally a client would unpack the entire record to obtain the data in this instance.

Representative Embodiments

As noted above, a graphic representation of an object can be used to convey information about that object. Such information may include files that contain any combination of text, images, sound, and video. Additionally, large amounts of information (e.g., regarding numerous objects), can be stored and indexed in one or more databases (e.g., an object database), using relatively little space (e.g., stored and indexed in compressed form). Stored indexed information about a particular object (e.g., an asset), can facilitate the location, access, and use of an object.

For example, information about an asset can be stored and indexed within a system incorporating an object database. An asset can include the asset itself, as well as rights with respect to the asset (e.g., the right to pledge the asset, the right to repledge the asset, the right to assign the asset, or the right to reassign the asset). In the event the asset needs to be located and used (e.g., as a pledge for an investment), the asset can be easily located and utilized as necessary. Additionally, the location and ownership of assets can be easily manipulated within an object database. For example, an asset owner can provide rights with respect to an asset to a vehicle (e.g., a legal entity or a division or other unit of a legal entity), for use as a backstop (e.g., a guarantee or other form of support for credit). The backstop in turn can be used by a third party (e.g., the vehicle), to enter into a transaction (e.g., to acquire a second asset). In this example, an object database can facilitate access and accountability with respect to objects such as the original asset, the transaction, the backstop, the pledge, the asset owner, and the vehicle.

In some embodiments, improved systems and methods for providing an asset owner with fixed or variable compensation or other benefit for one or more assets without requiring the asset owner to relinquish possession or ownership of the one or more assets are provided. In these embodiments, for example, the asset owner can pledge the one or more assets to a vehicle that can deploy the one or more assets and commit all or a portion of the value of the one or more assets to one or more of a plurality of transactions or other uses. In these embodiments, typically the asset owner may be able to obtain more advantageous investment or other terms than the asset owner otherwise would. The improved systems and methods can make value represented by the asset owner's equity in various classes of assets, available for a variety of uses.

The improvements provided by the disclosed systems and methods can be realized in one embodiment by the utilization of a vehicle that is interchangeably referred to herein as a "special purpose vehicle," "vehicle" or "SPV." An asset owner can provide rights to the vehicle. The rights provided can be with respect to all or a portion of the value of the asset. The rights provided can be for use by the vehicle in a manner that comports with specific or general risk or other parameters. For example, the asset owner may specify (e.g., to the vehicle using the rights), a maximum amount that can be invested (e.g., subjected to the claims of others). In another example, the asset owner may limit the vehicle to utilizing the owner's asset for transactions that historically have very little inherent risk.

In exchange for the right, the vehicle can agree to confer a specified benefit on the asset owner. A benefit can be a gross benefit or a net benefit. The amount of benefit conferred upon the asset owner by the vehicle can be commensurate with the actual or perceived risk inherent in the transactions authorized by the asset owner. For example, the vehicle can agree to absorb specified potential losses on an investment. Advantageously, the benefit conferred upon the asset owner by the vehicle can be any tangible or intangible benefit including, but not limited to, fixed fees, variable fees (e.g., a percentage of profits made by the vehicle utilizing the asset owner's rights), access to reduced interest rates on loans to the asset owner, access to reduced interest rates on loans to one or more individuals or entities designated by the asset owner, and charitable contributions made by the vehicle on behalf of the vehicle.

In some embodiments, a guarantee can be obtained for the benefit of the vehicle or a third party with respect to some or all of the value of the rights or the underlying assets. In some embodiments, a vehicle can have a measure of creditworthiness (e.g., an investment grade or other credit rating for the vehicle). In these embodiments, the guarantee can be utilized to achieve the measure of creditworthiness. The vehicle may be able to borrow money from a lender or enter into other transactions on the basis of a guarantee, a measure of creditworthiness, or both.

In some embodiments, a vehicle can obtain rights from a plurality of asset owners. In some embodiments, the vehicle can itself assess the value of such rights or the underlying assets. For example, an external service may not be available to provide a guarantee of the rights or the underlying assets. In some embodiments, regardless of whether a guarantee exists, there may be some other form of backstop (e.g., a liquidity provider or letter of credit provider).

In some embodiments, the vehicle can achieve results (e.g., borrow), on more advantageous terms than the asset owner can alone. Thus, the vehicle can make a pledge of an asset or the underlying asset more versatile or valuable (e.g., more liquid). For example, the portion of the value of an asset that can be borrowed against (e.g., used as a pledge) by the vehicle, can be greater than the portion that could be borrowed against (e.g., used as a pledge) by the asset owner (e.g., if the asset owner were borrowing on an individual basis). As another example, in instances where an optional credit rating is obtained by the vehicle, the vehicle can borrow money at interest rates that are more favorable than those that the asset owner could otherwise obtain (e.g., on an individual basis).

In some embodiments, the vehicle may engage the services of an internal or external manager. In these embodiments, the manager can agree to commit all or part of the value represented by the rights with respect to the assets or the underlying assets, to one or more transactions. Those transactions can provide returns or other benefits to the vehicle and the vehicle would in turn be able to confer a benefit upon the asset owners. Such benefits conferred by the vehicle upon an asset owner can exceed the benefits available to the asset owner on an individual basis (e.g., from previously known mechanisms for utilizing the value of assets). In some embodiments, benefits conferred by the vehicle upon an asset owner can be a type of benefit that is otherwise unavailable to the asset owner on an individual basis.

In some embodiments, the manager can utilize the rights emanating from one or more asset owners to engage in any type of investment or other transaction authorized by the asset owners. For example, the manager can have the vehicle act as a surety to guarantee the performance of a third party in an unrelated transaction. In this example, it might not be necessary to borrow against the value of the rights with respect to the assets or the underlying assets unless the third party defaulted on its obligations in the unrelated transaction. Thus, in this example, interest expense can be eliminated or minimized.

In some embodiments, the vehicle can borrow against the value of one or more assets that have been pledged to the vehicle (e.g., for investment purposes or to pay fees and expenses in connection with its operations). In these embodiments, the vehicle can borrow against the pledges of one or more assets or underlying assets over some or all of the lifetime of the pledges. In embodiments where the proceeds are utilized for one or more transactions, the vehicle can borrow against the pledges of one or more assets or underlying assets over some or all of the lifetime of the transactions. If the one or more assets in question include real estate, borrowing can be similar to mortgage financing or a home equity line of credit secured by the one or more assets. Additionally, in these embodiments, the vehicle may be able to borrow at more advantageous interest rates than would otherwise be available to an individual asset owner (e.g., because the assets have been pooled together). In practice, the operations of a vehicle in accordance with the present invention can involve some combination of transactions that entail borrowing and transactions that do not entail borrowing.

In some embodiments, the vehicle can have a number of desired characteristics commonly associated with arm's length counterparties. These characteristics can optionally include a measure of creditworthiness, liquidity, or management expertise (e.g., with respect to decisions regarding asset commitment). For example, the vehicle may also have a separate business, such as a bank or investment management company. In another embodiment, the vehicle possesses some or none of these characteristics, and if the vehicle utilizes characteristics it does not possess, the vehicle can avail itself of those other characteristics using counterparties. In some embodiments, the vehicle can have a measure of creditworthiness by virtue of the vehicle having rights with respect to one or more assets (e.g., owned by one or more owners). Alternatively, in some embodiments, the vehicle may have characteristics separate from the pledged assets that allow the vehicle to have a measure of creditworthiness. For example, a vehicle can have rights with respect to multiple pledged assets (e.g., where the vehicle has been operating for a time and/or has accumulated profits from previous transactions).

Thus, improved systems and methods are disclosed in which each asset owner in a plurality of asset owners can transfer rights with respect to an asset to a vehicle. For example, each asset owner can transfer their rights in exchange for benefits potentially or actually conferred upon the asset owner by the vehicle. Additionally, the vehicle can enter into one or more transactions (e.g., based on the pledge of the assets). In this manner, such systems and methods increase the utilization of such assets.

Detailed Embodiments

FIG. 1 shows an arrangement 100 according to a first embodiment. In arrangement 100, an asset owner 10 can provide one or more rights to vehicle 20 (e.g., the right to pledge an asset, the right to repledge an asset, the right to assign 16 an asset, or the right to reassign an asset) with respect to asset 12. For example, in arrangement 100, the right to assign 16 the asset 12 can facilitate the use of the asset 12 by the vehicle 20 with respect to a transaction 30. For example, a right to pledge the asset 12 (e.g., a first object), can be used by the vehicle 20 to obtain a second asset (e.g., a second object), such as transaction 30. Ways in which the asset 12 can be used to obtain or participate in transaction 30 will be discussed in greater detail below.

In some embodiments, obtaining the second object using the asset 12 (e.g., pledging asset 12 as part of, or in support of transaction 30), can affect the state of asset 12 or the asset owner 10. For example, transaction 30 can be unsuccessful, and therefore the asset owner 10 can experience an effect with respect to transaction 30 (e.g., a loss). As another example, transaction 30 can be successful, and therefore the asset owner 10 can experience a different effect with respect to transaction 30 (e.g., a fee or profit). In some embodiments, the effect transaction 30 has on the asset 12 or the asset owner 10 can be determined and the value of the asset 12 or the asset owner 10 can be revised based upon that effect.

Thus, the use of a right with respect to an asset 12 by the vehicle 20 in a transaction 30 can cause a value associated with the asset 12 or the asset owner 10 to be affected. Changes to values associated with asset 12 can be detrimental or beneficial depending on the nature and outcome of transactions utilizing the asset 12. For example, an effect on a value can be a loss equivalent to a percentage of asset 12 or a percentage of the loss on the transaction 30 (e.g., when the transaction 30 is unsuccessful). In another example, an effect on a value can be a gain equivalent to a percentage of asset 12 or a percentage of the gain on the transaction 30 (e.g., when the transaction 30 is successful).

In another example, an effect on a value can be a loss equivalent to a fixed or variable amount paid or incurred when a transaction 30 is unsuccessful. In another example, an effect on a value can be a gain equivalent to a fixed or variable fee received or earned when a transaction 30 is successful. In another example, an effect on a value can be a benefit to a charitable organization (e.g., a donation equivalent to some or all of the value of the asset 12 made on behalf of or attributable to the asset owner or another party when asset 12 is used in a transaction 30. In yet another example, an asset owner (e.g., an art museum) can pledge an asset (e.g., a piece of art) for use in a transaction. The loss on the asset can then be borne by a third party such that a loss resulting from the transaction will not cause the asset owner to lose the asset. In yet another example, an asset owner can pledge an asset as a backstop to a transaction undertaken by a charitable organization.

In some embodiments, parameters or boundaries can be imposed upon the rights 16 provided. In these embodiments, the selection of the one or more assets 12 with respect to the rights 16 provided by the asset owner 10 (e.g., for use by the vehicle 20 in one or more transactions 30), can be controlled by the parameters or boundaries authorized by the asset owner 10. For example, in some embodiments, asset owner 10 can specify a maximum amount that can be pledged by vehicle 20 with respect to each or all of the assets 12. In other embodiments, asset owner 10 can specify the degree of risk that vehicle 20 can subject the assets 12 to, and/or the term that vehicle 20 can use the rights 16 with respect to the asset 12. In some embodiments, asset owner 10 can provide a right 16 to vehicle 20 that is limited to a specified transaction 30.

In some embodiments, vehicle 20 has a measure of creditworthiness 22 (e.g., an investment grade or other credit rating), because of characteristics unrelated to the rights 16. Those characteristics can include, without limitation, (i) the ability and willingness to repay debt as evidenced by, for example, the vehicle's operational or financial history or resources and/or (ii) the accumulation of sufficient profit to become creditworthy in its own right. In some embodiments, the vehicle 20 has a measure of creditworthiness that is weaker than the asset owner's measure of creditworthiness. In some embodiments, the vehicle 20 has a measure of creditworthiness that is equal to the asset owner's measure of creditworthiness. In some embodiments, the vehicle 20 has a measure of creditworthiness that is stronger than the asset owner's measure of creditworthiness.

Although arrangement 100 only depicts a single asset owner 10 and a single pledge or other right 16, in more typical arrangements, a plurality of asset owners 10 can provide a plurality of rights 16 with respect to assets 12 to vehicle 20. Further, in some arrangements, a vehicle 20 can, in fact, be a plurality of different vehicles that vary in inherent risk, term, and/or other parameters. In some embodiments, more than 1, more than 10, more than 1,000, or more than 10,000 asset owners 10 can each provide rights 16 corresponding to asset(s) 12 to a vehicle 20.

As noted above, in some embodiments, in accordance with FIG. 1, vehicle 20 can make a commitment 24 to a transaction 30 (e.g., an investment). In some embodiments, the commitment 24 to a transaction 30 can be based upon all or a portion of the value of a single asset 12 (and/or the value of a single pledge or other right 16 with respect to a single asset 12) from a single asset owner 10. In some such embodiments, the amount of commitment 24 does not exceed the realizable net cash value of the underlying asset 12. In some such embodiments, the amount of commitment 24 does not exceed the amount authorized by the asset owner 10 for the transaction 30.

In some embodiments, the commitment 24 to a transaction 30 can be based on all or a portion of the value of some or all of a plurality of assets 12. Additionally, or alternatively, the commitment 24 to a transaction 30 can be based on a plurality of pledges or other rights 16 from one or more asset owners 10. In some such embodiments, the value of commitment 24 does not exceed the realizable net cash value of the plurality of assets 12. To illustrate, in one example, vehicle 20 can make a commitment 24 to a second object (e.g., transaction 30), based upon a pledge of ten different first objects (e.g., assets) having a combined value of one million dollars. In this example, because the ten different assets have a combined value of one million dollars, vehicle 20 can limit the amount of its commitment 24 (e.g., total liability, exposure, or investment), to transaction 30, to one million dollars. In some embodiments, the amount of commitment 24 does not exceed the amounts authorized with respect to asset 12 (e.g., by the one or more asset owners 10), for the transaction 30.

In some embodiments, when the outcome of the investment is favorable, vehicle 20 can receive a return 26 (e.g., revenue, income, profit or other benefit), in exchange for a commitment 24 made by vehicle 20. A return 26 can be a gross return or a net return. In some embodiments, vehicle 20 can use a return 26 it receives to pay income 18. In some embodiments, vehicle 20 can confer some other benefit on asset owner 10. Vehicle 20 can also derive a return 26 of its own. In some embodiments, vehicle 20 can be obligated to confer a return on asset owner 10 regardless of whether vehicle 20 earns a return 26 from the transaction 30. In some embodiments, if vehicle 20 does receive a return 26, this return 26, can be a factor used by vehicle 20 in securing an optional measure of creditworthiness 22.

In some embodiments, when the outcome of transaction 30 is unfavorable (e.g., there is a loss), vehicle 20 can be obligated to fund the amount of commitment 24. A loss can be a gross loss or a net loss. For example, when a loss occurs, a payment 28 can be made by vehicle 20 to cover the loss. After making payment 28, vehicle 20 can make a call (e.g., provide notification, make a request, or make a demand), upon asset owner 10 (e.g., to collect from asset owner 10 a payment 14 preferably equal to payment 28). In some embodiments, the call can be for an amount that is less than or equal to the total amount committed by vehicle 20 by commitment 24. For example, if vehicle 20 committed one million dollars to the transaction under commitment 24, payment 28 can be limited to one million dollars. In other embodiments, payment 28 can be secured by a plurality of assignments 16. Additionally, in some embodiments, some or all of the rights 16 provided can be for a different amount. In such embodiments, each asset owner 10 can be obligated to pay a pro rata amount to vehicle 20 in order to satisfy the call.

In some embodiments, if asset owner 10 has no independent means of funding payment 14, asset owner 10 can be obligated to liquidate asset 12, when asset 12 underlies the pledge or other right 16 provided to vehicle 20. In some embodiments, the terms of the right 16 provided can give vehicle 20 the right to liquidate asset 12 if such liquidation is necessary to fund payment 14 to vehicle 20.

For purposes of clarity, arrangement 100 as depicted in FIG. 1 involves only one asset 12 owned by one asset owner 10, corresponding to one set of rights 16 for one transaction 30. However, this embodiment of the invention may operate with a plurality of asset owners 10, assets 12, rights 16, vehicles 20, commitments 24 and/or transactions 30.

Figure 2:
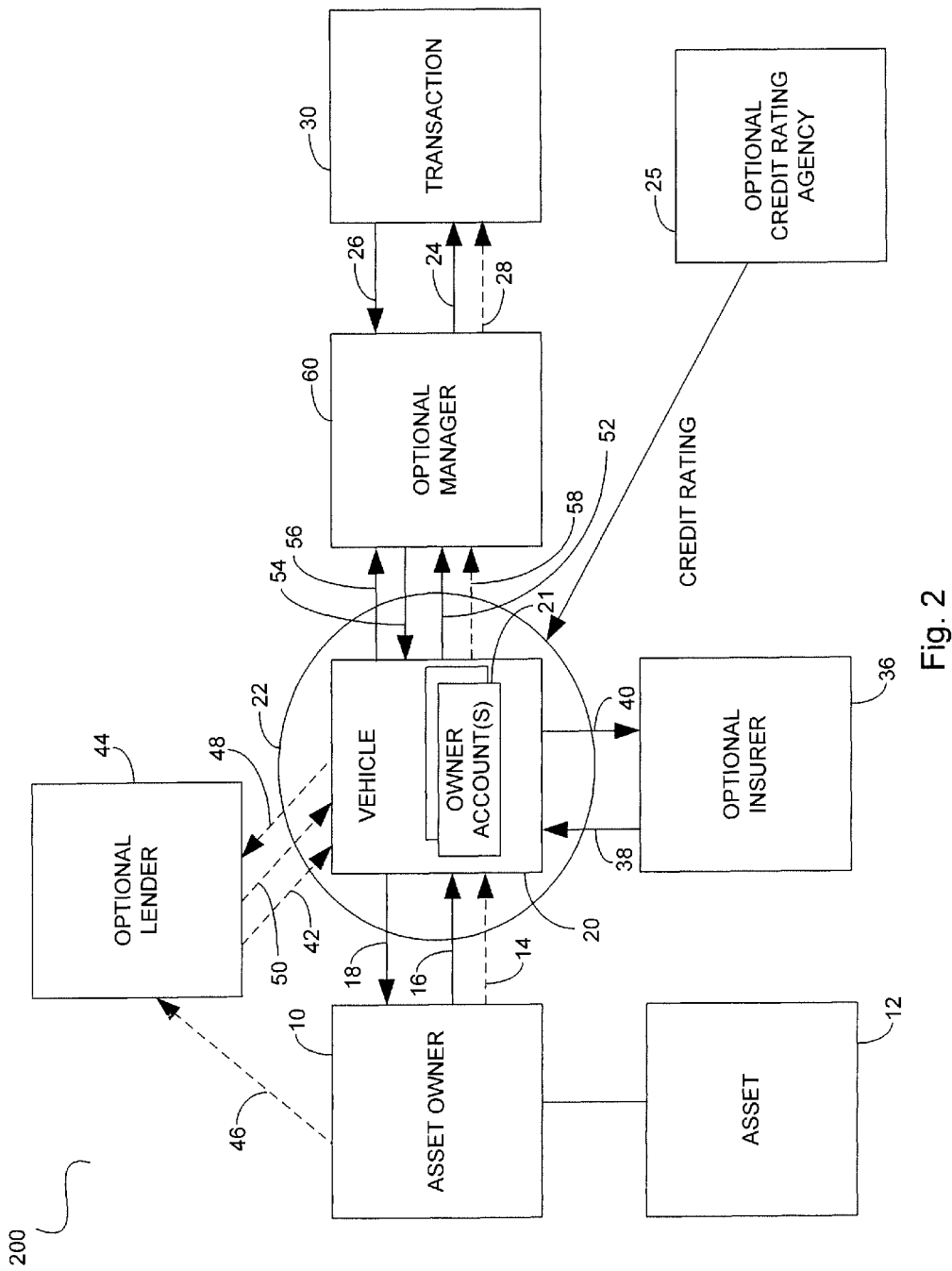
FIG. 2 is a schematic diagram of a second embodiment.

FIG. 2 shows an arrangement 200 according to another embodiment. As in arrangement 100, asset owner 10 in arrangement 200 provides rights 16 with respect to asset 12 to vehicle 20. In this embodiment, vehicle 20 can have a limited or insufficient measure of creditworthiness. In other embodiments, vehicle 20 can have no measure of creditworthiness, obligations or assets, other than the rights 16 provided by asset owner 10. In these embodiments, vehicle 20 (or another party), can contract with a third party (e.g., an insurer 36) to provide a backstop (e.g., a guarantee) 38 of all or a portion of the value of asset 12 (or the rights 16 provided with respect to asset 12), in exchange for compensation 40 (e.g., premiums). In some embodiments, insurer 36 can satisfy itself through its own valuation or underwriting of the asset 12, in connection with providing a guarantee 38. In other embodiments, insurer 36 can satisfy itself through a third party valuation or underwriting of the asset 12, in connection with providing a guarantee 38.

In some embodiments, as depicted in arrangement 100 and arrangement 200, each of a plurality of asset owners 10 can provide rights 16 corresponding to assets 12, to vehicle 20. In these embodiments, vehicle 20 may have no measure of creditworthiness, obligations, or assets other than rights 16 corresponding to the assets 12 provided by asset owners 10. In exchange for compensation 40, vehicle 20 can contract with an insurer 36 to provide a guarantee 38 for some or all of the value of assets 12 (or the rights 16 corresponding to assets 12) from a plurality of asset owners 10. In some embodiments, insurer 36 can satisfy itself through its own valuation or underwriting of the asset 12, in connection with providing a guarantee 38. In other embodiments, insurer 36 can satisfy itself through a third party valuation or underwriting of the asset 12, before providing vehicle 20 with a guarantee 38.

In some embodiments, utilizing the guarantee 38, vehicle 20 can obtain a measure of creditworthiness 22 (e.g., from optional credit rating agency 25 or elsewhere). In reliance upon a measure of creditworthiness 22, vehicle 20 can obtain (e.g., from a lender 44), a credit facility (e.g., a line of credit). In some embodiments, vehicle 20 can present guarantee 38 to a lender 44 for a line of credit. In these embodiments, vehicle 20 may not need to utilize optional credit rating agency 25.

Except as otherwise noted below, the remainder of the description of arrangement 200 may also apply to arrangement 100, and vice versa. In some embodiments, an entity lacking in investment expertise can have an excellent measure of creditworthiness. In other embodiments, a financial institution can choose to not retain the services of an outside manager as described below.

In some embodiments, vehicle 20 can engage the services of a manager to determine which transaction or transactions vehicle 20 should enter into or commit to. Manager 60 can act as the agent for vehicle 20 and enter into one or more agreements on behalf of vehicle 20. In some embodiments, the relationship between vehicle 20 and manager 60 is preferably governed by an agency contract 52. The agency contract 52 can transfer to manager 60 the right to either pledge or otherwise provide rights 16 with respect to asset 12, or to commit funds (e.g., equivalent to the realizable net cash value of underlying asset 12). In some embodiments, the manager's 60 right to pledge rights or committing funds can be enhanced by the measure of creditworthiness 22 of vehicle 20. In some embodiments, in exchange for the services of manager 60, vehicle 20 can agree to pay fees or other compensation 56 to manager 60. In some embodiments, manager 60 can work directly for vehicle 20, thus avoiding the need for an agency contract 52.

In the embodiment illustrated by FIG. 2, vehicle 20 can commit to or enter into a transaction 30 (e.g., by optionally acting through optional manager 60). Transaction 30 can be unrelated to other obligations between owners 10, vehicle 20 and optional insurer 36. In some embodiments, the value of the commitment 24 undertaken by optional manager 60 (or vehicle 20 operating without optional manager 60), preferably does not exceed the realizable net cash value of asset 12. In some embodiments, the value of the commitment 24 incurred by optional manager 60 (or incurred by vehicle 20 operating without optional manager 60), does not exceed an amount authorized by the asset owner 10.

If transaction 30 is profitable, income or some other benefit 26 can be generated for vehicle 20. As noted above, a benefit can be a gross benefit or a net benefit. In embodiments where an optional external manager 60 is used, the optional external manager 60 preferably remits some or all of that income or other benefit 26 to vehicle 20 by way of a payment 54. From the amounts paid to the vehicle 20 in payment 54, vehicle 20 can pay income or confer some other benefit (e.g., reduced borrowing costs, contribution to a charity on behalf of asset owner 10, etc.) to asset owner 10. In some embodiments, vehicle 20 can also pay compensation 40 to insurer 36, or pay some or all of any interest 48 that may be owed to lender 44. In some embodiments, a portion or the entire balance remaining can be kept by vehicle 20 as revenue. Referring to FIG. 2, lender 44, insurer 36, credit rating agency 25, and manager 60, are all optional. In some embodiments, a credit rating agency 25 is not used. In some embodiments, an insurer 36 is not used. In some embodiments, an manager 60 is not used. In some embodiments, a lender 44 is not used.

In some embodiments (e.g., in the case where the outcome of transaction 30 is a loss), vehicle 20 can be obligated to fund the amount of commitment 24. In embodiments where there is an optional manager 60, a payment 28 can be made by optional manager 60 to cover some or all of the loss. That payment 28 can be made by optional manager 60 on behalf of vehicle 20. That payment can be funded by funds 50 provided to vehicle 20 by lender 44 pursuant to a line of credit for vehicle 20. In some embodiments, funds 50 can be forwarded by vehicle 20 to manager 60 by way of a payment 58. In other embodiments, there can be a direct payment by lender 44 to manager 60 at the direction of vehicle 20. In still other embodiments, no optional manager 60 is used, and payment 28 is made by vehicle 20. Additionally, vehicle 20 can make interest payments 48 to lender 44 utilizing funds 50 disbursed by lender 44. In some embodiments, vehicle 20 or optional manager 60 can make payments 28 utilizing funds of the vehicle 20 (e.g., when there is no lender 44).

In cases where payments 28 are necessary, vehicle 20 can make a call on asset owner 10. In some embodiments, this call can require a payment 14 from asset owner 10 that is sufficient to cover some or all of payment 28. In some embodiments, the payment can be equal to the funds 50 borrowed from lender 44, plus interest 48. In some embodiments, if asset owner 10 does not make payment 14, vehicle 20 can have the right to liquidate the asset 12 that underlies the rights 16 provided to the vehicle 20. In some embodiments, the vehicle 20 has the right to liquidate the asset 12 (e.g., according to the terms of pledge 16). In these embodiments, vehicle 20 can also have the right to retain proceeds in an amount sufficient to fund some or all of payment 14 to vehicle 20. Should the value of asset 12 be insufficient to cover the loss, in some embodiments, lender 44 can have recourse to insurer 36 (e.g., for some or all of the shortfall).

In some embodiments, asset owner 10 can borrow funds 42 from lender 44 to satisfy the obligation of asset owner 10 to make payment 14 to vehicle 20. In other embodiments, vehicle 20 can arrange for asset owner 10 to borrow funds 42 from lender 44 to satisfy the obligation of asset owner 10 to make payment 14 to vehicle 20. In these cases, lender 44 can disburse the borrowed funds 42 (e.g., in an amount equal to what is required by payment 14), to vehicle 20 (e.g., in lieu of asset owner 10 making payment 14 to vehicle 20). Also, in this alternative embodiment of arrangement 100 or 200, asset owner 10 can be obligated to provide lender 44 with repayment 46 of interest and principal on the loan, in exchange for lender 44 disbursing funds 42.

As in the case of FIG. 1, for purposes of clarity, arrangement 200 as depicted in FIG. 2 involves rights 16 with respect to only one asset 12 owned by one asset owner 10, backstopping one transaction 30. However, this embodiment of the invention may operate with a plurality of asset owners 10, assets 12, rights 16, vehicles 20, commitments 24, transactions 30 insurers 36, lenders 44, and/or optional managers 60.

In some embodiments there is one or more administrators (not shown) that can control or otherwise be affiliated with vehicle 20 in an arrangement hereinafter referred to as an administering arrangement. The administrator can monitor and evaluate the parameters (e.g., risk and anticipated or expected return), of the various choices by optional manager 60 regarding transactions 30 corresponding to commitments 24 made on behalf of vehicle 20. Additionally, the results of that monitoring and evaluation can be made available (e.g., to asset owners 10). In this alternative embodiment, the administrator can track the benefits and detriments (e.g., income and losses), generated as a result of transactions 30. Additionally, the administrator can create a mechanism for the timely distribution of income 18 resulting from transactions 30. Moreover, the administrator can notify asset owners 10 to request and coordinate payments 14 necessitated by losses which can include facilitating liquidation of the pledged assets 12.

In any embodiment of the invention involving a plurality of assets 12, asset owners 10 or transactions 30, the administrator may establish a system to advertise, market and/or promote participation by asset owners 10, vehicles 20, insurers 36, lenders 44, or optional managers 60.

The types of assets 12 that the present invention can utilize include, but are not limited to, relatively illiquid assets such as real estate, life insurance contracts, pension benefits, annuity contracts, a beneficiary's interest in trust funds, restricted securities, lease income, royalties, artwork, automobiles, jewelry, and other personal property, as well as relatively liquid assets such as stocks, bonds, or contracts in traded commodities, and other personal property. Similarly, those assets 12 could be committed to a variety of different kinds of transactions 30. Vehicle 20 can participate in any type of transaction 30 (e.g., financial transaction), in which asset owner 10 could participate, as well as numerous transactions in which asset owner 10 could not participate.

As discussed above, it may be that characteristics of vehicle 20 itself allow vehicle 20 to have a measure of creditworthiness without resorting to an insurer 36. Where an insurer 36 is used, in some embodiments, insurer 36 can be unaffiliated with vehicle 20. However, in some embodiments, insurer 36 can be affiliated with vehicle 20. In some embodiments, insurer 36 is not used. In some embodiments vehicle 20 does not have or does not obtain a measure of creditworthiness. Similarly, if a lender 44 is used, in some embodiments, lender 44 can be unaffiliated with vehicle 20. However, in some embodiments, lender 44 can be affiliated with vehicle 20. In some embodiments, the function of lender 44 can be performed by vehicle 20 itself. For example, vehicle 20 can use profits from previous transactions, or from unrelated endeavors (e.g., where vehicle 20 is a bank), to function as lender 44. Thus, in some embodiments, vehicle 20 can fund some or all of any necessary payment 58 without resorting to an external lender. In other embodiments, vehicle 20 can obtain funding from an external lender 44 (e.g., using commercial paper).

Additionally, if an optional manager 60 is used, in some embodiments, optional manager 60 can be unaffiliated with vehicle 20. However, in other embodiments, optional manager 60 can be affiliated with vehicle 20. In still other embodiments, the function of optional manager 60 can be partially or entirely performed by vehicle 20 when vehicle 20 (or personnel in vehicle 20) have sufficient expertise to evaluate and decide which transactions 30 to commit to, without resorting to an external manager.

As discussed above, both arrangement 100 (as depicted in FIG. 1), and arrangement 200 (as depicted in FIG. 2), involve only one asset 12 and one asset owner 10. The present invention can also operate in arrangements with a plurality of assets 12 and asset owners 10. In some embodiments involving a plurality of assets 12 and a plurality of asset owners 10, asset owners 10 can be divided into two (or more) classes with different rights and/or different exposures. For example, a first class of asset owners 10 can agree to provide rights 16 with respect to assets 12 such that the first class of asset owners 10 is primarily obligated to fund payments 28 (e.g., by way of payments 14 or borrowed funds 42), required as a result of losses (e.g., in transactions 30). In exchange for the primary obligation to fund payments 28, the first class of asset owners 10 can be entitled to a relatively larger portion of income 18.

In some embodiments, in exchange for a secondary obligation, a second class of asset owners can be entitled to receive a relatively smaller portion of income 18. The second class of asset owners 10 can provide rights with respect to assets 12, whereby the second class of asset owners 10 can be obligated to fund payments 28 (e.g., by way of payments 14 or borrowed funds 42), brought about by losses in transactions 30 only to the extent that the amount of the required payments 28 exceed the value of the assets 12 and the respective rights 16 provided by asset owners 10 in the first class. In another embodiment involving at least one asset 12 and a plurality of vehicles 20 or a plurality of transactions 30, the asset owner 10 can have the option to transfer the right corresponding to the asset 12 from one vehicle to another vehicle or from one transaction to another transaction. In these embodiments, the optional guarantee 38 (e.g., as obtained from insurer 36), can be included as part of the transfer.

In embodiments including a plurality of assets 12 and asset owners 10, each asset owner 10 can receive participation in a vehicle 20 (e.g., shares, units, or percentages), in accordance with the value of the asset 12 that the asset owner 10 has provided rights 16 for to the vehicle 20. For example, a first asset owner 10 can have an asset (e.g., a car that is worth $50,000.00), and the first asset owner 10 can grant the right 16 to pledge the asset 12 to vehicle 20. Further, a second asset owner 10 can have a second asset (e.g., a car that is worth $100,000.00), and the second asset owner 10 can grant the right 16 to pledge the second asset 12 to vehicle 20. In this example, as compared to the first asset owner, the second asset owner can receive twice as many shares, units, or other forms of participation in the vehicle 20, the income, or other forms of benefit 18 conferred by the vehicle 20 on asset owners 10. However, if there is a call and payments 14 are to be made, the second asset owner 10, can be obligated to pay twice as much as the first asset owner 10.

In other embodiments in which there are a plurality of assets 12 and asset owners 10, each respective asset owner 10 can receive shares, units, or other forms of participation in vehicle 20 corresponding to an amount that an asset owner 10 will allow a vehicle 20 to pledge (e.g., with respect to a transaction 30 based upon the asset 12). For example, a first asset owner 10 can have a first asset 12 (e.g., artwork that is worth $50,000.00), and the first asset owner 10 can grant the vehicle 20 a right to pledge the full value of the first asset. Additionally, a second asset owner 10 can have a second asset 12 (e.g., a car that is worth $100,000.00), but the second asset owner 10 only grants the vehicle 20 a right to pledge up to $25,000.00 against the second asset. In this example, the first asset owner, can be entitled to receive twice as many shares, units, or other forms of participation in vehicle 20, the income, or other forms of benefit 18 conferred by the vehicle 20 on asset owners 10 even though the second asset owner 10 has an underlying asset that is worth more than the underlying asset 12 of the first asset owner 10. However, if there is a call and payments 14 are to be made, the first asset owner 10 can be obligated to pay twice as much as the second asset owner 10.

In some embodiments, vehicle 20 can provide incentives for larger rights 16 to pledge assets 12. In some embodiments, the incentives are proportional to the amount authorized by the asset owner 10 under transaction 30. In some embodiments the incentives are not proportional to the amount authorized by the asset owner 10 under transaction 30. For example, a first asset owner 10 can have a first asset 12 (e.g., a car that is worth $50,000.00), and the first asset owner 10 can grant the vehicle 20 a right 16 to pledge the first asset 12. Additionally, a second asset owner 10 can have a second asset 12 (e.g., a car that is worth $100,000.00), and the second asset owner 10 can grant the vehicle 20 a right 16 to pledge the second asset. In this example, with respect to the first asset owner, the second asset owner can receive twice as many shares, units, or other forms of participation in the vehicle 20, the income, or other form of benefit 18 conferred by the vehicle 20 on asset owners 10. This example assumes that the amount of benefit 18 is directly proportional to the value of rights 16 granted.

In some embodiments, to encourage asset owners 10 to provide rights 16 with a higher value to vehicle 20, a disproportionally large benefit 18 (e.g., as compared to the value of the right 16 granted), can be conferred upon the asset owners 10. In some embodiments, to encourage asset owners 10 to provide rights 16 with higher value to vehicle 20, the conferred benefit 18 can be tiered. In one such tiered arrangement, where a second rate is better than a first rate, asset owners 10 that provide rights 16 to the vehicle 20 corresponding to assets 12 having less than a specified value, obtain a first rate of return 18 (or other form of benefit). Asset owners 10 that provide rights 16 corresponding to assets 12 having more than a predetermined value, obtain a second rate of return 18 (or other form of benefit). In some embodiments, there can be any number of tiers in a tiered arrangement.

In another embodiment in which there are a plurality of assets 12 and asset owners 10, asset owners 10 may be divided into two (or more) classes. For example, a first class of asset owners 10 can agree to be primarily responsible to fund any payments 28 brought about by losses in transactions 30 (e.g., by way of payments 14 or borrowed funds 42), in exchange for a larger portion of income 18. Additionally, a second class of asset owners 10 can receive a smaller portion of income 18 and can be responsible for funding payments 28 (e.g., by way of payments 14 or borrowed funds 42), only to the extent that the amount of the required payments 28 exceeded the value of the assets pledged by asset owners 10 in the first class. In another embodiment, involving at least one asset 12 and a plurality of vehicles 20 or a plurality of transactions 30, the asset owner 10 can have the option to transfer the right 16 corresponding to an asset 12 from one vehicle 20 to another vehicle 20 or from one transaction 30 to another transaction 30. In some embodiments, a transfer can include an optional guarantee 38 (e.g., obtained from insurer 36 prior to the transfer).

Any arrangement according to any embodiment of the invention involving a plurality of assets owners 10, assets 12, or transactions 30 can be arranged so that any individual asset owner 10 and that owner's asset 12 can begin or end participation in the system at any time. In some embodiments, some form of notice (e.g., 30 days written notice) can be required. Alternatively, in some embodiments, a participant's entry date or exit date, or both, can be restricted. With respect to entry dates, for example, the arrangement can require that asset owners 10 join on specified dates. With respect to exit dates, for example, the arrangement can require that once an asset owner 10 has joined the arrangement, that asset owner 10 must remain in the arrangement for some predetermined minimum duration (e.g., three years, five years, etc).

In any arrangement according to any embodiment of the invention, an account 21 may be set up with respect to vehicle 20 for each participating asset owner 10. Amounts 18 due to asset owner(s) 10 may be accumulated inside vehicle 20 (e.g., for some predetermined or other period of time), before being remitted to asset owner(s) 10. In some embodiments, during the period that they are retained, accumulated amounts can be used as an alternate source of funding for any payments 28 from an asset owner 10. Additionally, funds can be used as an alternative to payments 14 from asset owner(s) 10 regardless of whether the funds were borrowed by asset owner(s) 10 from lender 44.

In any embodiment of the present invention, the entity administering that embodiment can establish a system (described below) to provide proof and documentation to asset owners 10, lender 44 (if used), and insurer 36 (if used) regarding the amounts and circumstances surrounding losses in any transaction 30 that would trigger payments 58 and 28. Additionally, in some embodiments, the system can also provide (e.g., send or transmit), periodic reports (e.g., monthly or quarterly), to asset owners 10 detailing asset owner profits or losses and the value of their accounts. For example, a periodic report can include details about the assets 12 (e.g., adjusted for realized and/or unrealized profits or losses), corresponding to rights 16 provided to the vehicle 20. In some embodiments, the system can also provide annual statements that may be required to satisfy obligations of asset owners 10 (e.g., reporting profits, losses, assets, or liabilities to taxing authorities or other governmental authorities).

The entity administering any embodiment of the present invention can establish a system of settling disputes arising between any two or more parties. Parties can include for example, vehicle 20, any asset owner 10, any lender 44 (if used), and any insurer 36 (if used). In some embodiments, the system of settling disputes can include disputes between two parties in the same class of parties (e.g., between two asset owners 10 or between two lenders 44, etc.), regarding their participation in that embodiment of the present invention. Disputes can include disputes regarding responsibilities and obligations in connection with payments 18, providing rights 16 with respect to assets 12, any losses in any transaction 30 giving rise to the payments 14 and 58, or any other dispute arising out of participation in an embodiment of the present invention. In some embodiments, the dispute resolution system can provide for arbitration (e.g., binding or non-binding arbitration), of disputes.

Figure 7:
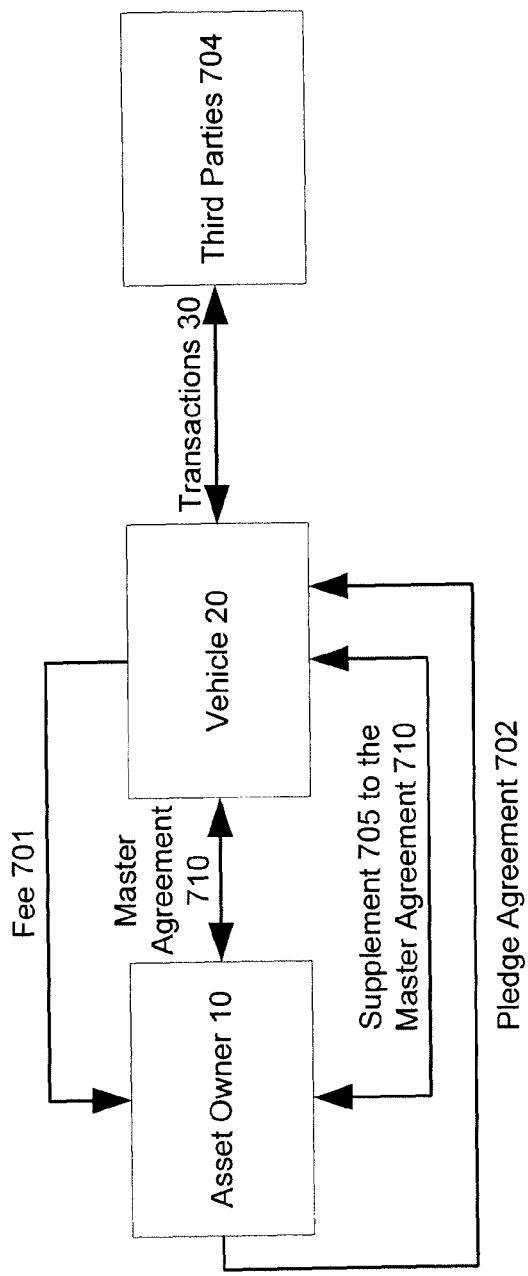
FIG. 7 is a schematic diagram of another embodiment.

FIG. 7 is a schematic diagram of another embodiment in which a vehicle 20 (e.g., a special purpose vehicle), is utilized for the purpose of enabling an asset owner 10 to earn returns from the asset owner's 10 assets (not shown). In some embodiments, asset owners 10 can earn returns from a vehicle 20 (e.g., in the form of fees). The asset owner 10 can earn the returns as a result of allowing the vehicle 20 to pledge the asset owner's 10 assets as collateral (e.g., to secure specified contingent financial obligations). The contingent financial obligations can arise out of financial transactions 30 (e.g., with third parties 704), authorized by the asset owner 10. The fee (or other form of return) 701 that the vehicle 20 pays the asset owner 10 can be commensurate with the actual or perceived risk inherent in the financial transactions 30 approved by the asset owner 10.

In some embodiments, the vehicle 20 can enter into a master agreement 710 with asset owner 10 (e.g., to establish a relationship). The master agreement 710 can contain terms governing financial transactions 30 that the asset owner 10 and the vehicle 20 can enter into over time. In some embodiments, financial transactions 30 can be documented under supplements 705 (e.g., schedules) to the master agreement 710. In these embodiments, each supplement 705 to the master agreement 710 can contain terms of specific transactions. Additionally, the terms of the supplement 705 to the master agreement 710 can mirror the terms of a transaction 30 entered into by the vehicle 20.

In some embodiments, the master agreement 710 and the supplement 705 to the master agreement 710 can include the components of a contractual relationship between an asset owner 10 and a vehicle 20. A master agreement 710 entered into by an asset owner 10 with a vehicle 20 can include broad parameters governing the relationship. Additionally, the master agreement 710 can allow the vehicle 20 and asset owner 10 to enter into specific financial transactions 30 at any time, pursuant to one or more supplements 705 to the master agreement 710. The master agreement 710 can establish standardized terms that can uniformly apply to each specific transaction between the vehicle 20 and the asset owner 10, pursuant to one or more supplements 705 to the master agreement 710.

In some embodiments, the master agreement 710 can include any combination of representation and warranties for each asset owner 10, representation and warranties for each vehicle 20, provisions governing the substitution of collateral, conditions triggering the termination of the master agreement 710, events that would constitute an event of default on the part of either the asset owner 10 or the vehicle 20, provisions restricting the transferability of the master agreement 710, and the governing law and jurisdiction of the master agreement 710. In some embodiments, supplements 705 to the master agreement 710 can set the specific terms and parameters of one or more individual transactions that the asset owner 10 and the vehicle 20 engage in pursuant to the master agreement 710. Additionally, in some embodiments, the vehicle 20 and the asset owner 10 can enter into one or more pledge agreements 702. In these embodiments, the pledge agreement 702 can include terms under which the asset owner 10 can pledge collateral to the vehicle 20 (e.g., to support the asset owner's 10 obligations under the master agreement 710).

The embodiment depicted in FIG. 7 includes only one asset owner 10 that provides one pledge for one transaction 30. Other embodiments can operate with a plurality of asset owners 10, assets 12, pledges 16, vehicles 20 and/or transactions 30.

Figure 8:
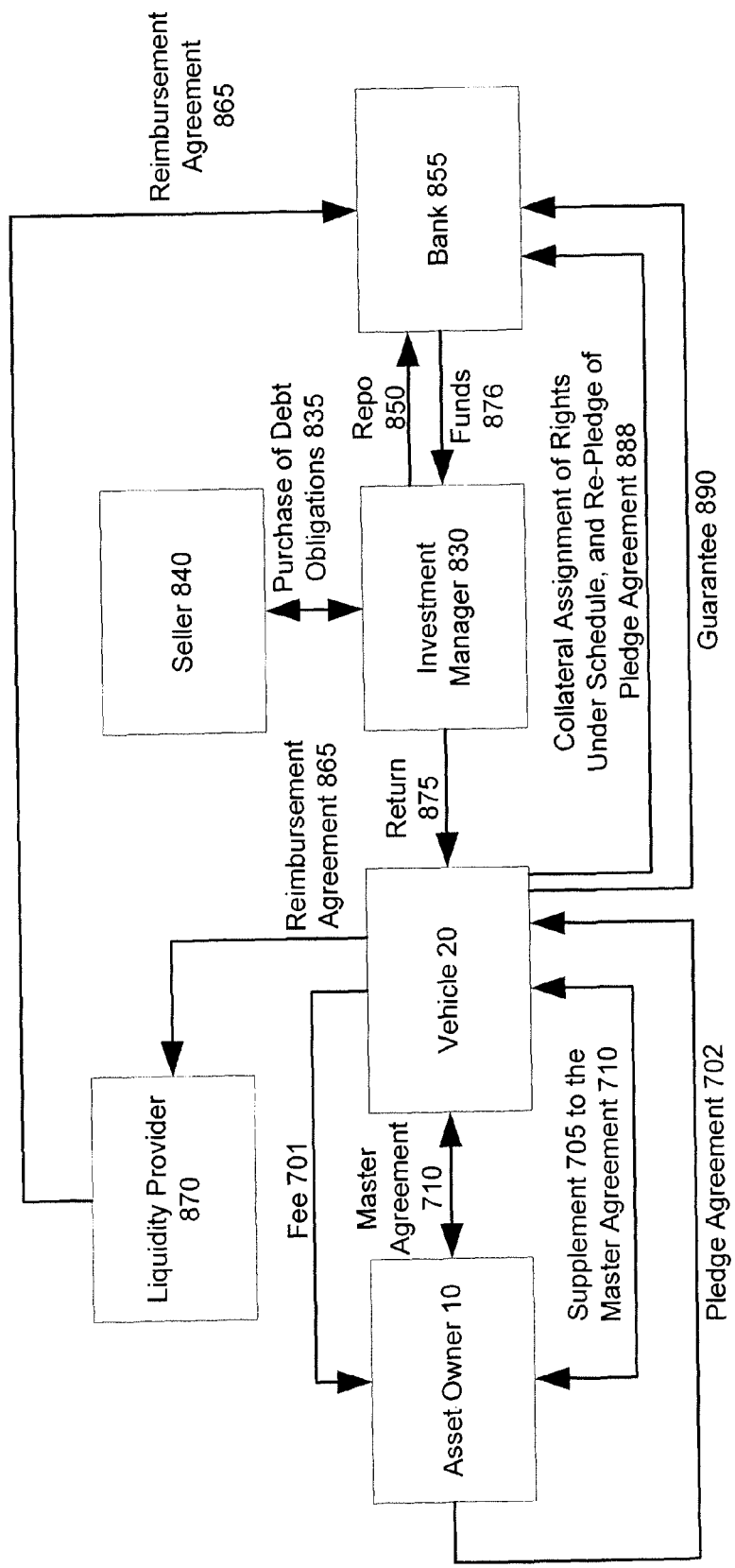
FIG. 8 is a schematic diagram of another embodiment.

FIG. 8, a schematic diagram of another embodiment, further exemplifies a relationship in accordance with an aspect of the disclosure. The operation of the master agreement 710 and the pledge arrangement are illustrated in greater detail below. In some embodiments, an internal or external investment manager 830 (e.g., an "IM") can purchase 835 debt instruments (e.g., asset-backed securities and collateralized debt obligations or "debt obligations"), from a third party seller 840. In these embodiments, the IM 830 can finance a purchase by entering into a repurchase agreement 850 ("Repo") with one or more financial institutions (e.g., Bank 855), whereby IM 830 can receive funds 876 from bank 855 equal to the purchase price of the debt obligations 835.

Under the terms of the repo 850, the debt obligations 835 can be marked-to-market (e.g., on a periodic or other basis). To the extent the value of the debt obligations is less than an amount calculated by reference to the repo amount, bank 855 can be entitled to additional collateral under the terms of the repo 850. In some embodiments, to avoid the possibility of having to provide its cash or other assets as additional collateral to bank 855, IM 830 can maintain ready access to additional collateral that can be pledged to bank 855 in case of a decrease in the value of the debt obligations 835.

In some embodiments, the vehicle 20 can enter into a supplement 705 to the master agreement 710 with asset owner 10. In these embodiments, asset owner 10 can commit (e.g., on a non-recourse basis), to pay an amount equal to the excess of the repo amount over the value of the debt obligations as of a future date (e.g., the maturity date of the Repo 850). In these embodiments, the asset owner's 10 payment obligation (e.g., under the supplement 160 or otherwise), can be capped at a specified maximum dollar amount (the "maximum amount").

In some embodiments, the asset owner 10 can pledge specified assets to vehicle 20 to secure the asset owner's 10 obligations under the supplement 705 to the master agreement 710. In some embodiments, in exchange for the pledge 702, vehicle 20 can pay asset owner 10 a return (e.g., a collateral fee), that can be based upon the return earned from the debt obligations. In some embodiments, the asset owner's 10 obligations (which can be non-recourse), can be capped at the maximum amount agreed to in the supplement 705 to the master agreement 710. In these embodiments, the asset owner 10 would only bear the risk corresponding to a drop in the value of the debt obligations to the extent of the maximum amount.

In some embodiments, the bank 855 can enter into a reimbursement agreement 865 (e.g., a liquidity agreement), with a liquidity provider 870 whereby liquidity provider 870 can provide additional collateral (e.g., cash or U.S. government Treasury securities), at a specified time (e.g., immediately), to bank 855 (e.g., in satisfaction of IM's 830 obligations to post collateral to bank 855). The obligation of liquidity provider 870 can be capped, for example, at the maximum amount. In these embodiments, the vehicle 20 can enter into a reimbursement agreement 865 with liquidity provider 870 pursuant to which vehicle 20 can agree to reimburse liquidity provider 870 (e.g., on a non-recourse basis), for amounts advanced by liquidity provider 870 under the reimbursement agreement 865.

In some embodiments, the vehicle 20 can secure obligations under the reimbursement agreement 865 by collaterally assigning and re-pledging 888 its rights to the security interests under the supplement 705 to the master agreement 710 and the reimbursement agreement 865 with the liquidity provider 870. In some embodiments, the vehicle 20 can secure obligations under the reimbursement agreement 865 by using a guarantee 890. In exchange for entering into the reimbursement agreement 865 and the pledge agreement 702, IM 830 can pay vehicle 20 a return 875 (e.g., a fee), that can be based on the return earned from the debt obligations.

In these embodiments, if the IM 830 becomes obligated to post additional collateral to bank 855 under the terms of the repo 850, asset owner 10 can incur a corresponding collateralized obligation with respect to vehicle 20 (e.g., under the terms of a corresponding supplement 705 to the master agreement 710 and pledge agreement 702). Thus, in some embodiments, if the value of the debt obligations drops below the repo amount, bank 855 can demand and receive the collateral shortfall from the liquidity provider 870 at a specified time (e.g., immediately). In embodiments where bank 855 receives additional collateral from liquidity provider 870, asset owner 10 (e.g., through vehicle 20), can have a non-recourse secured/collateralized obligation to liquidity provider 870 (e.g., pursuant to the back-to-back agreements). If asset owner 10 fails to pay an amount owing under the supplement 705 to the master agreement 710, liquidity provider 870 can be entitled to exercise remedies enumerated under the pledge agreement 702.

For purposes of clarity, the embodiment depicted in FIG. 8 involves only one asset owner 10, one pledge agreement 702, one master agreement 710, one IM 830, one repo 850 and/or one bank 855. However, this embodiment of the invention may operate with a plurality of asset owners 10, vehicles 20, master agreements 710, banks 855, supplements 705 to the master agreements 710 and/or liquidity providers 870.

Additional Embodiments

Embodiment 1. A method for increasing expected return on an asset for its owner, the method comprising:
  obtaining from the owner, by an entity other than the owner, rights to pledge the asset; and
  entering, by the entity, into a transaction based on a pledge of the asset.

Embodiment 2. The method of embodiment 1 further comprising returning, by the entity, to the owner, at least a portion of profit from the transaction.

Embodiment 3. The method of embodiment 1 further comprising obtaining, by the entity, a guarantee of value of the asset, the guarantee providing the entity with a credit rating stronger than a credit rating of the owner.

Embodiment 4. The method of embodiment 3 further comprising borrowing from a lender, by the entity, based on the guarantee of capital for participation in the transaction.

Embodiment 5. The method of embodiment 3, further comprising establishing a mechanism for settling disputes arising between or among any one of the owner, the entity, a provider of the guarantee, the lender, and a provider of the guarantee.

Embodiment 6. The method of embodiment 1 further comprising collecting, by the entity, of payment from the owner to cover at least a portion of losses from the transaction.

Embodiment 7. The method of embodiment 6 further comprising:
  establishing, by the entity, an account for the owner;
  retaining, by the entity, of at least a portion of profits from the transaction in the account;
  entry, by the entity, into a further transaction based on the profits; and
  withdrawing, by the entity, of funds from the account to cover losses in the further transaction.

Embodiment 8. The method of embodiment 6 further comprising:
  establishing, by the entity, an account for the owner;
  requiring the owner to deposit funds in the account; and
  withdrawing, by the entity, of funds from the account to cover losses in the transaction.

Embodiment 9. The method of embodiment 1 wherein the asset is selected from the group consisting of real property, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Embodiment 10. A method for increasing liquidity of assets for owners of the assets, the method comprising:
  obtaining from each respective one of the owners, by an entity other than any of the owners, rights to pledge respective ones of the assets; and
  entering, by the entity, into a plurality of transactions, each of the transactions based on a pledge of at least a part of one of the assets.

Embodiment 11. The method of embodiment 10 further comprising returning, by the entity, to each the owner, of at least a portion of profit from each the transaction.

Embodiment 12. The method of embodiment 10 further comprising obtaining, by the entity, of a respective guarantee of value of each respective one of the assets, the respective guarantee providing the entity with a credit rating stronger than a credit rating of any one of the owners.

Embodiment 13. The method of embodiment 12 further comprising borrowing from a lender, by the entity, based on at least one the guarantee, of capital for participation in at least one the transaction.

Embodiment 14. The method of embodiment 12, further comprising establishing a mechanism for settling disputes arising between any two or more parties including (i) at least one of the owners, (ii) the entity, (iii) the lender, and (iv) at least one provider of at least one the guarantee.

Embodiment 15. The method of embodiment 10 further comprising borrowing from a lender, by the entity, based on the credit rating, of capital for participation in at least one of the transactions.

Embodiment 16. The method of embodiment 15, further comprising establishing a mechanism for settling disputes arising between any two or more parties including (i) at least one of the owners, (ii) the entity, (iii) the lender, and (iv) at least one provider of at least one the guarantee.

Embodiment 17. The method of embodiment 10 further comprising collecting, by the entity, of payment from the at least one owner to cover at least a portion of losses from the at least one transaction.

Embodiment 18. The method of embodiment 17 further comprising:
  establishing, by the entity, a respective account for each the owner;
  retaining, by the entity, of at least a portion of profits from at least one of the transactions in at least some of the accounts;
  entry, by the entity, into at least one further transaction based on the profits; and
  withdrawing, by the entity, of funds from the at least some of the accounts to cover losses in the at least one further transaction.

Embodiment 19. The method of embodiment 17 further comprising:
  establishing, by the entity, a respective account for each the owner;
  requiring one or more of the owners to deposit funds in respective ones of the accounts; and
  withdrawing, by the entity, of funds from the respective ones of the accounts to cover losses in at least one the transaction.

Embodiment 20. The method of embodiment 19 wherein:
  the owners are divided into at least two classes;
  owners in a first one of the classes are primarily responsible for covering the losses up to a limit; and
  owners in a second one of the classes are responsible for covering the losses only after the losses exceed the limit.

Embodiment 21. The method of embodiment 20 wherein:
  each the owner in the first one of the classes receives a first portion of profit from the transactions;
  each the owner in the second one of the classes receives a second portion of profit from the transactions; and
  the first portion proportionately exceeds the second portion.

Embodiment 22. The method of embodiment 10 wherein:
  the owners are divided into at least two classes;
  owners in a first one of the classes are primarily responsible for covering losses in the transactions up to a limit; and
  owners in a second one of the classes are responsible for covering the losses only after the losses exceed the limit.

Embodiment 23. The method of embodiment 22 wherein:
  each the owner in the first one of the classes receives a first portion of profit from the transactions;
  each the owner in the second one of the classes receives a second portion of profit from the transactions; and the first portion proportionately exceeds the second portion.

Embodiment 24. The method of embodiment 10 wherein each the asset is selected from the group consisting of real estate, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Embodiment 25. Apparatus for administering a method for increasing liquidity of an asset for its owner, the apparatus comprising:
   means for recording obtaining from the owner, by an entity other than the owner, rights to pledge the asset; and
   means for effecting entry, by the entity, into a transaction based on a pledge of the asset.

Embodiment 26. The apparatus of embodiment 25 further comprising means for returning, by the entity, to the owner, of at least a portion of profit from the transaction.

Embodiment 27. The apparatus of embodiment 25 further comprising means for recording obtaining, by the entity, of a guarantee of value of the asset, the guarantee providing the entity with a credit rating stronger than a credit rating of the owner.

Embodiment 28. The apparatus of embodiment 27 further comprising means for effecting borrowing from a lender, by the entity, based on the guarantee, of capital for participation in the transaction.

Embodiment 29. The apparatus of embodiment 27, further comprising means for administering a mechanism for settling disputes arising between any one of the owner, the entity, a provider of the guarantee and the lender.

Embodiment 30. The apparatus of embodiment 25 further comprising means for accepting payment from the owner to cover at least a portion of losses from the transaction.

Embodiment 31. The apparatus of embodiment 30 further comprising:
   means for establishing an account for the owner;
   means for retaining, by the entity, of at least a portion of profits from the transaction in the account;
   means for effecting entry, by the entity, into a further transaction based on the profits; and
   means for withdrawing, by the entity, of funds from the account to cover losses in the further transaction.

Embodiment 32. The apparatus of embodiment 30 further comprising:
   means for establishing an account for the owner;
   means for requiring the owner to deposit funds in the account; and
   means for withdrawing, by the entity, of funds from the account to cover losses in the transaction.

Embodiment 33. The apparatus of embodiment 25 wherein the asset is selected from the group consisting of real estate, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Embodiment 34. Apparatus for administering a method for increasing liquidity of assets for owners of the assets, the apparatus comprising:
   means for obtaining from each respective one of the owners, by an entity other than any of the owners, rights to pledge a respective one of the assets; and
   means for effecting entry, by the entity, into a plurality of transactions, each of the transactions being based on a pledge of at least one of the assets.

Embodiment 35. The apparatus of embodiment 34 further comprising means for returning, by the entity, to each the owner, of at least a portion of profit from each the transaction.

Embodiment 36. The apparatus of embodiment 34 further comprising means for effecting obtaining, by the entity, of a respective guarantee of value of each respective one of the assets, the respective guarantee providing the entity with a credit rating stronger than a credit rating of any one of the owners.

Embodiment 37. The apparatus of embodiment 36 further comprising means for effecting borrowing from a lender, by the entity, based on at least one the guarantee, of capital for participation in at least one the transaction.

Embodiment 38. The apparatus of embodiment 36, further comprising means for administering a mechanism for settling disputes arising for settling disputes arising between any two or more parties including (i) at least one of the owners, (ii) the entity, (iii) the lender, and (iv) at least one provider of at least one the guarantee.

Embodiment 39. The apparatus of embodiment 34 further comprising means for accepting payment from at least one the owner to cover at least a portion of losses from at least one the transaction.

Embodiment 40. The apparatus of embodiment 39 further comprising:
   means for establishing, by the entity, a respective account for each the owner;
   means for retaining, by the entity, of at least a portion of profits from at least one of the transactions in at least some of the accounts;
   means for effecting entry, by the entity, into at least one further transaction based on the profits; and
   means for withdrawing, by the entity, of funds from the at least some of the accounts to cover losses in the at least one further transaction.

Embodiment 41. The apparatus of embodiment 39 further comprising:
   means for establishing, by the entity, a respective account for each the owner;
   means for requiring at least some of the owners to deposit funds in respective ones of the accounts; and
   means for withdrawing, by the entity, of funds from the respective ones of the accounts to cover losses in at least one the transaction.

Embodiment 42. The apparatus of embodiment 41 further comprising means for classifying the owners are divided into at least two classes; wherein:
   owners in a first one of the classes are primarily responsible for covering the losses up to a limit; and
   owners in a second one of the classes are responsible for covering the losses only after the losses exceed the limit.

Embodiment 43. The apparatus of embodiment 42 further comprising:
   means for allocating to each the owner in the first one of the classes a first portion of profit from the transactions; and
   means for allocating to each the owner in the second one of the classes a second portion of profit from the transactions; wherein:
   the first portion proportionately exceeds the second portion.

Embodiment 44. The apparatus of embodiment 34 further comprising means for classifying the owners are divided into at least two classes; wherein:
   owners in a first one of the classes are primarily responsible for covering losses in the transactions up to a limit; and
   owners in a second one of the classes are responsible for covering the losses only after the losses exceed the limit.

Embodiment 45. The apparatus of embodiment 44 further comprising:
- means for allocating to each the owner in the first one of the classes a first portion of profit from the transactions; and
- means for allocating to each the owner in the second one of the classes a second portion of profit from the transactions; wherein:
- the first portion proportionately exceeds the second portion.

Embodiment 46. The apparatus of embodiment 34 wherein each the asset is selected from the group consisting of real estate, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Embodiment 47. Apparatus for administering a method for increasing liquidity of assets for owners of the assets, the apparatus comprising:
- a first trading subsystem that secures, from the asset owners, rights to pledge the assets, thereby supporting a credit rating, the first trading system including a recording unit for recording the rights in a public registry, the recording unit including a communications channel that communicates with the public registry;
- a second trading subsystem that enters into a plurality of transactions, each of the transactions based on a pledge of at least one of the assets;
- a bookkeeping subsystem for establishing and maintaining an account for each of the owners, the bookkeeping subsystem including a payment subsystem that allocates profits from the transactions to the accounts, and a collection subsystem that debits asset owners to cover losses from the accounts; and
- a communications bus interconnecting the subsystems.

Embodiment 48. The apparatus of embodiment 47 wherein the collection subsystem bills asset owners to cover the losses.

Embodiment 49. The apparatus of embodiment 47 wherein the collection subsystem deducts at least a portion of the losses from at least some of the accounts.

Embodiment 50. The apparatus of embodiment 47 wherein:
- the owners are divided into at least two classes;
- the collection subsystem debits owners in a first one of the classes for losses in the transactions up to a limit; and
- the collection subsystem debits owners in a second one of the classes for the losses only after the losses exceed the limit.

Embodiment 51. The apparatus of embodiment 47 wherein the first trading subsystem effects obtaining of a respective guarantee of value of each respective one of the assets, the respective guarantee enhancing the credit rating.

Embodiment 52. The apparatus of embodiment 51 wherein the first trading subsystem further effects borrowing from a lender, based on at least one the guarantee, of capital for participation in at least one the transaction.

Embodiment 53. The apparatus of embodiment 52 further comprising a dispute resolution unit that administers a mechanism for settling disputes arising between any two or more parties including (i) at least one of the owners, (ii) the entity, (iii) the lender, and (iv) at least one provider of at least one the guarantee.

Embodiment 54. The apparatus of embodiment 47 wherein each the asset is selected from the group consisting of real estate, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Embodiment 55. The apparatus of embodiment 47 wherein at least one of the subsystem comprises a central processing unit.

Embodiment 56. An investment product for owners of assets comprising participation in an entity that administers a method for increasing liquidity of assets for the owners of the assets, the method comprising:
- obtaining from each respective one of the owners, by an entity other than any of the owners, rights to pledge respective one of the assets; and
- entering, by the entity, into a plurality of transactions, each of the transactions based on a pledge of at least one of the assets.

Embodiment 57. A data storage medium encoded with machine-executable instructions for performing a method for increasing liquidity of assets for owners of the assets, the method comprising:
- obtaining from each respective one of the owners, by an entity other than any of the owners, rights to pledge respective one of the assets; and
- entering, by the entity, into a plurality of transactions, each of the transactions based on a pledge of at least one of the assets.

Embodiment 58. The data storage medium of embodiment 57 wherein the instructions further comprise instructions for returning, by the entity, to each the owner, of at least a portion of profit from each the transaction.

Embodiment 59. The data storage medium of embodiment 57 wherein the instructions further comprise instructions for obtaining, by the entity, of a respective guarantee of value of each respective one of the assets, the respective guarantee enhancing the credit rating.

Embodiment 60. The data storage medium of embodiment 59 wherein the instructions further comprise instructions for borrowing from a lender, by the entity, based on at least one the guarantee, of capital for participation in at least one the transaction.

Embodiment 61. The data storage medium of embodiment 59, wherein the instructions further comprise instructions for establishing a mechanism for settling disputes arising between any two or more parties including (i) at least one of the owners, (ii) the entity, (iii) the lender, and (iv) at least one provider of at least one the guarantee.

Embodiment 62. The data storage medium of embodiment 57 wherein the instructions further comprise instructions for collecting, by the entity, of payment from at least one the owner to cover at least a portion of losses from at least one the transaction.

Embodiment 63. The data storage medium of embodiment 62 wherein the instructions further comprise instructions for:
- establishing, by the entity, a respective account for each the owner;
- retaining, by the entity, of at least a portion of profits from at least one of the transactions in at least some of the accounts;
- entry, by the entity, into at least one further transaction based on the profits; and
- withdrawing, by the entity, of funds from the at least some of the accounts to cover losses in the at least one further transaction.

Embodiment 64. The data storage medium of embodiment 62 wherein the instructions further comprise instructions for:
- establishing, by the entity, a respective account for each the owner;

requiring at least some of the owners to deposit funds in respective ones of the accounts; and
withdrawing, by the entity, of funds from the respective ones of the accounts to cover losses in at least one the transaction.

Embodiment 65. The data storage medium of embodiment 64 wherein, in the method:
the owners are divided into at least two classes;
owners in a first one of the classes are primarily responsible for covering the losses up to a limit; and
owners in a second one of the classes are responsible for covering the losses only after the losses exceed the limit.

Embodiment 66. The data storage medium of embodiment 65 wherein, in the method:
each the owner in the first one of the classes receives a first portion of profit from the transactions;
each the owner in the second one of the classes receives a second portion of profit from the transactions; and
the first portion proportionately exceeds the second portion.

Embodiment 67. The data storage medium of embodiment 57 wherein, in the method:
the owners are divided into at least two classes;
owners in a first one of the classes are primarily responsible for covering losses in the transactions up to a limit; and
owners in a second one of the classes are responsible for covering the losses only after the losses exceed the limit.

Embodiment 68. The data storage medium of embodiment 67 wherein, in the method:
each the owner in the first one of the classes receives a first portion of profit from the transactions;
each the owner in the second one of the classes receives a second portion of profit from the transactions; and
the first portion proportionately exceeds the second portion.

Embodiment 69. The data storage medium of embodiment 57 wherein, in the method, each the asset is selected from the group consisting of real estate, life insurance contracts, pension benefits, annuity contracts, a beneficiary's interest in a trust, funds held in an individual retirement account, restricted securities, lease income, royalties, artwork, stocks, bonds, futures contracts in traded commodities, and other personal property.

Computer Embodiments

The present invention may be administered using any of a variety of computer systems—ranging from a modest personal computer (such as one based on the 80×86 series of microprocessors originally developed by Intel Corporation, of Santa Clara, Calif., and currently represented by the Pentium® family of microprocessors and related processors such as the Core® Duo and Core® 2 Duo processors) equipped with a spreadsheet and/or database program, to a supercomputer, depending on the number of potential participating asset owners 10 and assets 12.

A computer system for administering the method of the present invention could process applications for participation by asset owners 10. This could include printing application forms for completion by asset owners 10 seeking to participate in vehicle 20, in which case the data from completed applications could then be entered by human operators. Alternatively, the data could be entered by operators based on verbal responses from an applicant, who may appear live at the vehicle's place of business or may call by telephone. Or the system could include access over an external network such as the Internet (or via modem), by which an applicant could complete an application online. As part of the application process, the system could print the necessary documents for completion by an asset owner 10 for pledging an asset 12 and could also be used to record receipt of pledge documents (whether or not printed by the system).

The computer preferably would similarly administer the various transactions 30, preferably keeping track of necessary trades, as well as payments made and received, and preferably would also administer participant accounts 21, keeping track of payments due to or from participating asset owners 10. Account administration preferably would also include sending periodic statements to participating asset owners 10, including statement sent annually (or on some other timetable as required by the relevant taxing authorities) to enable participating asset owners 10 to meet their tax reporting and payment obligations. If external insurers or lenders are involved, the system preferably also would keep track of those relationships (either between the vehicle and the external entity or entities, or between individual asset owners 10 and the external entity or entities) and payments to be made to or from the external entities. In addition, the system preferably would keep track of any open disputes and the status of attempts to resolve those disputes.

Figure 3:
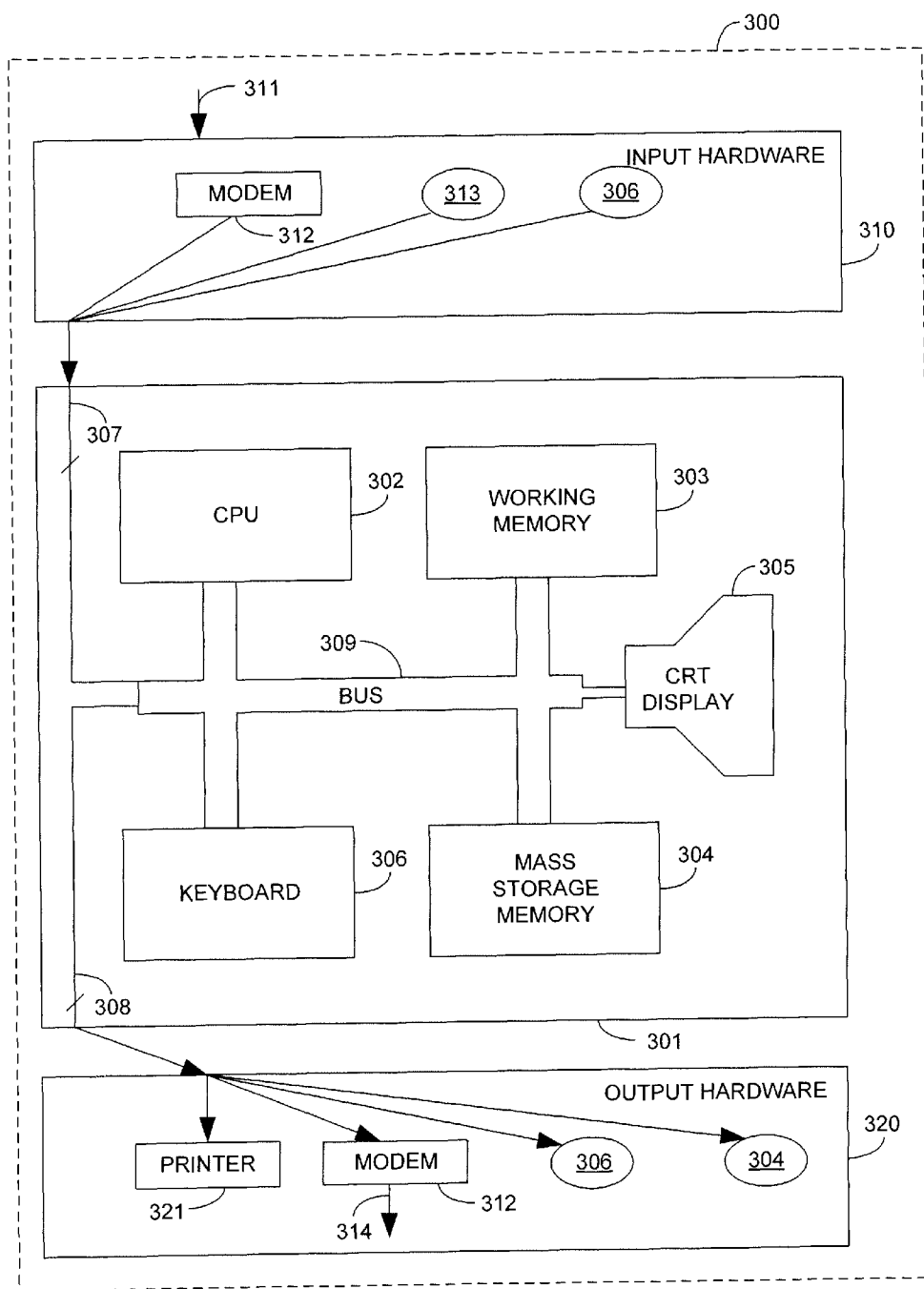
FIG. 3 is a schematic diagram of a first exemplary hardware system for implementing one or more of the methods disclosed herein.

An exemplary computer hardware system 300 with which the present invention may be implemented is shown in FIG. 3. System 300 preferably includes a computer 301 comprising a central processing unit ("CPU") 302, a working memory 303 which may be, e.g., RAM (random-access memory) or "core" memory, mass storage memory 304 (such as one or more disk drives or CD-ROM or DVD-ROM drives), one or more display terminals 305 which may be based on cathode-ray tubes ("CRTs") or liquid crystal displays or plasma displays or any other display technology that may be used for computer display terminals, one or more keyboards 306, one or more input lines 307, and one or more output lines 308, all of which are interconnected by a conventional bidirectional system bus 309.

Input hardware 310, coupled to computer 301 by input lines 307, may be implemented in a variety of ways. Market value data and other transaction data may be inputted from an online financial service via the Internet, or dedicated data line 311, or the use of a modem or modems 312 and a conventional telephone line. Alternatively or additionally, input hardware 310 may include CD-ROM or DVD-ROM drives or disk drives 313. In conjunction with display terminal 305, keyboard 306 may also be used as an input device.

Output hardware 320, coupled to computer 301 by output lines 308, may similarly be implemented by conventional devices. By way of example, output hardware 320 may include CRT display terminal 305 for displaying the status of a participating asset owner's account 21 or particular assets 10 in that account 21, payments to be made to or received from participants, that status of any outstanding dispute requiring resolution, or any aspect of operation of the method according to the invention. Output hardware 320 might also include a printer 321, so that hard copy output may be produced, or a disk drive 313, to store system output for later use. Where asset trades are to be executed in connection with a transaction 30, trading information may be transmitted over the Internet or dedicated data lines 314, or possibly by telephone with the use of modem 312, to cause the trades to be executed.

In operation, CPU 302 coordinates the use of the various input and output devices 310, 320, coordinates data accesses from mass storage 304 and accesses to and from working memory 303, and determines the sequence of data processing steps.

Figure 4:
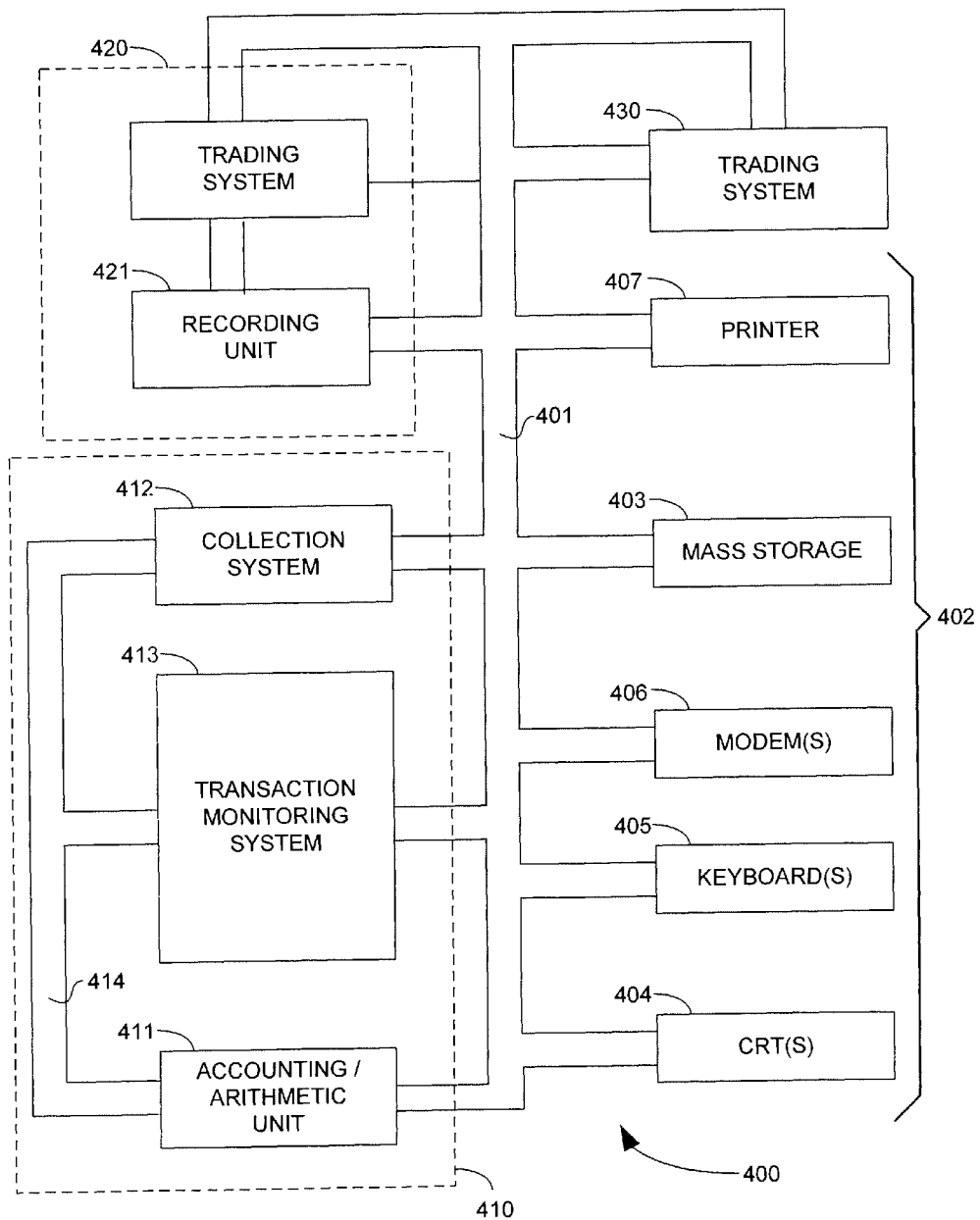
FIG. 4 is a schematic diagram of a second exemplary hardware system for implementing one or more of the methods disclosed herein.

In FIG. 4, which shows a second preferred embodiment of apparatus for administering the invention, hardware combination 400 replaces CPU 302 for many of the functions performed in administering the method of the invention. Although a CPU of some kind will still be used for many of the bookkeeping operations of the system (billing, collection, etc.), in the embodiment of FIG. 4 many of the functions are carried out by special purpose hardware. Although some or all of the dedicated hardware modules could be implemented as single-program general purpose microprocessors, they may also be implemented as hard-wired logic (such as appropriately hard-wired gate arrays). As still another alternative, all or part of this hardware combination 400 could be implemented by a programmable logic device ("PLD"), such as those manufactured by Altera Corporation, of San Jose, Calif. One advantage to using a PLD-based hardware system would be the ability to dynamically reconfigure the hardware components.

Apparatus 400 preferably is built around a communications bus 401 similar to bus 309 of FIG. 3. Although not shown in FIG. 4, a CPU similar to CPU 302 may also be included in apparatus 400, connected to bus 401. System 400 also includes input/output devices 402 similar to those in system 300, including one or more mass storage devices 403, one or more CRTs 404, one or more keyboards 405, one or more modems 406, and one or more printers 407.

Bookkeeping subsystem 410, whose functions could also be performed by a CPU (not shown) as discussed above, preferably includes an accounting/arithmetic unit 411 for keeping track of the accounts 21 of the various asset owners 10, a collection system 412 for billing asset owners 10 and keeping track of their payments, and transaction monitoring system 413 for monitoring transactions 30. Although each module of subsystem 410 is preferably connected directly to bus 401, at least some of the modules may also be interconnected by local bus 414.

A first trading system 420 preferably secures for the vehicle, from participating asset owners 10, the rights 16 to pledge assets 10. System 420 preferably includes the logic and communications ability (in conjunction with modems 406 available through bus 401) necessary to secure those rights. Preferably, system 420 includes recording unit 421 for recording pledges 16, and releases thereof, in the appropriate public registry, if applicable.

A second trading system 430 preferably handles any aspects of transactions 30 that may involve purchases or sales of securities in the public markets.

Figure 5:
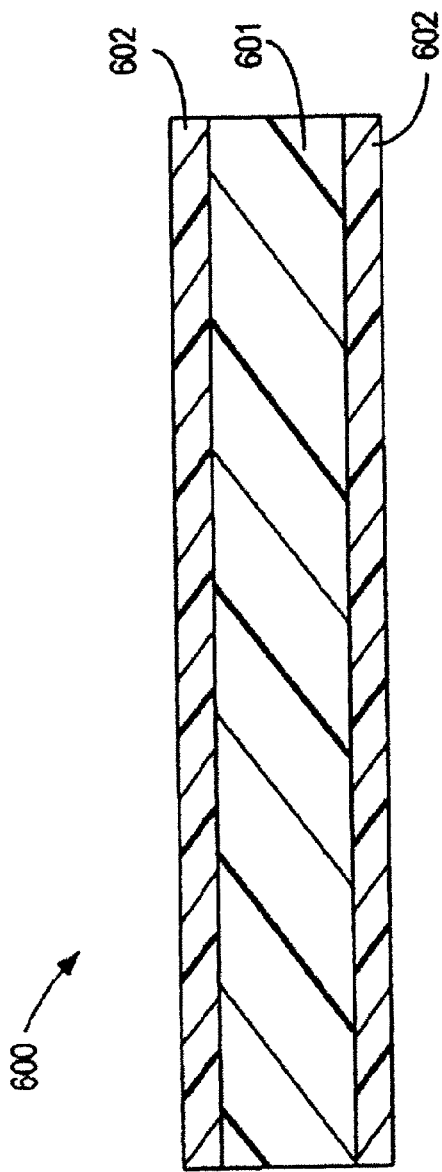
FIG. 5 is a cross-sectional view of a magnetic data storage medium encoded with a set of machine-executable instructions for performing one or more of the methods disclosed herein.

FIG. 5 presents a cross section of a magnetic data storage medium 600 which can be encoded with a machine executable program that can be carried out by systems such as the aforementioned personal computer, or other computer or similar device to administer the method of the invention. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a system such as a personal computer or other computer or similar system, in accordance with the invention.

Figure 6:
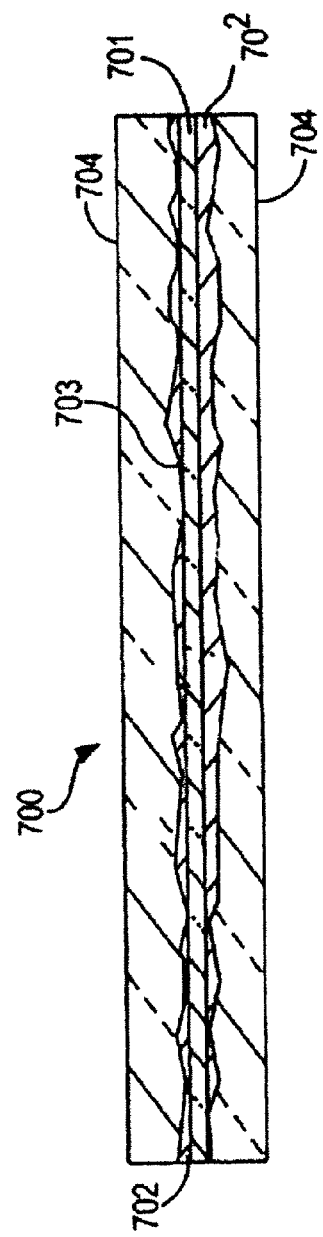
FIG. 6 is a cross-sectional view of an optically readable data storage medium encoded with a set of machine executable instructions for performing one or more of the methods disclosed herein.

FIG. 6 shows a cross section of an optically-readable data storage medium 700 which also can be encoded with such a machine-executable program, which can be carried out by systems such as the aforementioned personal computer, or other computer or similar device for administering the method of the invention. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

The present invention can be implemented as a computer program product that comprises a computer program mechanism embedded in a computer-readable storage medium. Further, any of the methods of the present invention can be implemented in one or more computers or other forms of apparatus. Examples of apparatus include, but are not limited to, a computer, and a spectroscopic measuring device (e.g., a microarray reader or microarray scanner). Further still, any of the methods of the present invention can be implemented in one or more computer program products. Some embodiments of the present invention provide a computer program product that encodes any or all of the methods disclosed herein. Such methods can be stored on a CD-ROM, DVD, magnetic disk storage product, or any other computer-readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

REFERENCES CITED

All references cited herein are incorporated herein by reference in their entirety and for all purposes to the same extent as if each individual publication or patent or patent application was specifically and individually indicated to be incorporated by reference in its entirety herein for all purposes.

Modifications

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method, comprising:
   assigning, using one or more processors, a right to pledge a portion of one or more assets, wherein the assignment is made to at least one vehicle by one or more asset owners, and wherein each asset owner has the option to have the right to pledge a portion of an asset transferred from a first transaction to a second transaction or from a first vehicle to a second vehicle;
   receiving, using the one or more processors, one or more rights to pledge a portion of one or more assets, wherein each right to pledge is received by the at least one vehicle from the one or more asset owners, wherein each asset owner can grant at least one right to pledge corresponding to at least one asset, and wherein each right to pledge has one or more associated terms;
   pledging, using the one or more processors, a portion of one or more assets to one or more transactions, wherein each transaction can have multiple outcomes;
   determining, using the one or more processors, an amount of participation for each asset owner for each transaction, wherein each amount of participation is determined according to either a value of the portion of one or more assets associated with a right to pledge, or a predefined amount of one or more assets associated with a right to pledge;
   determining, using the one or more processors, a class for each asset owner for each transaction, wherein each determined class includes one or more associated predefined benefits or one or more associated predefined detriments; and
   realizing, using the one or more processors, one or more outcomes for the one or more transactions, wherein an outcome produces a predefined benefit or a predefined detriment for the one or more asset owners according to the amount of participation or the determined class.

2. The method of claim 1, wherein each class has different associated predefined benefits.

3. The method of claim 1, wherein each class has different associated predefined benefits or predefined detriments.

4. The method of claim 1, wherein the one or more rights to pledge are received by one or more vehicles.

5. The method of claim 1, further comprising:
   imposing one or more parameters or one or more boundaries upon a right to pledge.

6. The method of claim 1, further comprising:
   associating a right to pledge with a type of parameter such as a specific risk parameter, a general risk parameter, or another type of parameter.

7. The method of claim 1, wherein participation by an asset owner or a right to pledge begins or ends at any time.

8. The method of claim 1, further comprising:
   restricting participation by an asset owner.

9. The method of claim 1, wherein a value corresponding to a portion of one or more assets is available for a variety of uses.

10. The method of claim 1, wherein a transaction can be the acquisition of an asset.

11. The method of claim 1, wherein an asset owner enters into a master agreement containing terms governing the one or more rights to pledge.

12. The method of claim 11, wherein the master agreement contains terms that uniformly apply to the one or more rights to pledge.

13. The method of claim 11, wherein the master agreement includes any combination of the following: representations and warranties for the one or more asset owners, representations and warranties for each vehicle, one or more provisions governing substitution of collateral, one or more conditions permitting the termination of the master agreement, one or more enumerated events that would constitute an event of default, one or more provisions restricting the transferability of the master agreement, a governing law corresponding to the master agreement, and a governing jurisdiction corresponding to the master agreement.

14. The method of claim 11, wherein the master agreement can be supplemented by one or more supplemental agreements.

15. The method of claim 4, further comprising:
   transferring a right to pledge a portion of an asset from one vehicle to another vehicle.

16. The method of claim 1, further comprising:
   transferring a right to pledge a portion of an asset from one transaction to another transaction.

17. The method of claim 1, wherein the predefined benefit includes fixed compensation or variable compensation.

18. The method of claim 1, wherein the predefined benefit is a potential benefit or an actual benefit.

19. The method of claim 1, wherein the predefined benefit is commensurate with an actual or perceived risk.

20. The method of claim 1, wherein asset owners can be divided into two or more asset owner classes.

21. The method of claim 1, wherein predefined benefits associated with a determined class are tiered.

22. The method of claim 1, wherein the one or more rights to pledge is received by a vehicle, and wherein when a transaction is unsuccessful, an asset owner suffers a loss.

23. The method of claim 22, wherein the vehicle can make a call on the asset owner for all or part of the loss.

24. The method of claim 22, wherein the asset owner is required to liquidate an asset to fund all or part of the loss.

25. The method of claim 1, wherein an account is established for an asset owner.

26. The method of claim 1, wherein a vehicle retains at least some of the predefined benefit, and wherein the vehicle can enter into at least one transaction based upon the predefined benefit.

27. The method of claim 1, wherein an asset owner deposits funds into an account used to cover losses on the one or more transactions.

28. The method of claim 1, wherein a vehicle can fund payments.

29. The method of claim 1, wherein a vehicle is entitled to a predefined benefit.

30. The method of claim 1, wherein when a transaction is unsuccessful, a loss is suffered by a third party.

31. The method of claim 1, further comprising:
   entering into a repurchase agreement to finance a transaction.

32. The method of claim 1, further comprising:
   entering into an agreement with a liquidity provider.

33. The method of claim 1, further comprising:
   obtaining a guarantee with respect to a right to pledge, or with respect to an asset.

34. The method of claim 1, further comprising:
   securing an obligation using the one or more rights to pledge.

35. The method of claim 1, wherein the transfer includes a guarantee.

36. The method of claim 1, wherein the transfer includes a guarantee.

37. The method of claim 1, further comprising:
obtaining a form of backstop.

38. The method of claim 1, further comprising:
engaging the services of an internal or external manager.

39. The method of claim 38, wherein the manager enters into one or more transactions on behalf of an asset owner or a vehicle.

40. The method of claim 1, wherein a vehicle has a number of characteristics associated with counterparties.

41. The method of claim 1, wherein a vehicle has a measure of creditworthiness.

42. The method of claim 1, wherein a vehicle is able to borrow money.

43. The method of claim 1, wherein a vehicle performs the function of lender.

44. The method of claim 1, further comprising:
engaging the services of one or more administrators.

45. The method of claim 1, wherein a vehicle has a separate business.

46. The method of claim 1, wherein a vehicle makes a pledge of an asset more valuable.

47. The method of claim 1, further comprising:
settling disputes.

48. The method of claim 1, wherein a vehicle achieves results on more advantageous terms than at least some asset owners.

49. A method, comprising:
assigning, using one or more processors, a right to pledge one or more assets, wherein the assignment is made to at least one vehicle by one or more asset owners, and wherein each asset owner has the option to have the right to pledge an asset transferred from a first transaction to a second transaction or from a first vehicle to a second vehicle;
receiving, using the one or more processors, one or more rights to pledge one or more assets, wherein each right to pledge is received by the at least one vehicle from the one or more asset owners, wherein each asset owner can grant at least one right to pledge corresponding to at least one asset, and wherein each right to pledge has one or more associated terms;
pledging, using the one or more processors, the one or more assets to one or more transactions, wherein each transaction can have multiple outcomes;
determining, using the one or more processors, an amount of participation for each asset owner for each transaction, wherein each amount of participation is determined according to either a value of one or more assets associated with a right to pledge, or a predefined amount of one or more assets associated with a right to pledge;
determining, using the one or more processors, a class for each asset owner for each transaction, wherein each determined class includes one or more associated predefined benefits or one or more associated predefined detriments; and
realizing, using the one or more processors, one or more outcomes for the one or more transactions, wherein an outcome produces a predefined benefit or a predefined detriment for the one or more asset owners according to the amount of participation or the determined class.

50. A system, comprising:
one or more processors;
a computer-readable storage medium containing instructions configured to cause the one or more processors to perform operations, including:
assigning a right to pledge a portion of one or more assets, wherein the assignment is made to at least one vehicle by one or more asset owners, and wherein each asset owner has the option to have the right to pledge a portion of an asset transferred from a first transaction to a second transaction or from a first vehicle to a second vehicle;
receiving one or more rights to pledge a portion of one or more assets, wherein each right to pledge is received by the at least one vehicle from the one or more asset owners, wherein each asset owner can grant at least one right to pledge corresponding to at least one asset, and wherein each right to pledge has one or more associated terms;
pledging a portion of one or more assets to one or more transactions, wherein each transaction can have multiple outcomes;
determining an amount of participation for each asset owner for each transaction, wherein each amount of participation is determined according to either a value of the portion of one or more assets associated with a right to pledge, or a predefined amount of one or more assets associated with a right to pledge;
determining a class for each asset owner for each transaction, wherein each determined class includes one or more associated predefined benefits or one or more associated predefined detriments; and
realizing one or more outcomes for the one or more transactions, wherein an outcome produces a predefined benefit or a predefined detriment for the one or more asset owners according to the amount of participation or the determined class.

51. A system, comprising:
one or more processors;
a computer-readable storage medium containing instructions configured to cause the one or more processors to perform operations, including:
assigning a right to pledge one or more assets, wherein the assignment is made to at least one vehicle by one or more asset owners, and wherein each asset owner has the option to have the right to pledge an asset transferred from a first transaction to a second transaction or from a first vehicle to a second vehicle;
receiving one or more rights to pledge one or more assets, wherein each right to pledge is received by the at least one vehicle from the one or more asset owners, wherein each asset owner can grant at least one right to pledge corresponding to at least one asset, and wherein each right to pledge has one or more associated terms;
pledging the one or more assets to one or more transactions, wherein each transaction can have multiple outcomes;
determining an amount of participation for each asset owner for each transaction, wherein each amount of participation is determined according to either a value of one or more assets associated with a right to pledge, or a predefined amount of one or more assets associated with a right to pledge;
determining a class for each asset owner for each transaction, wherein each determined class includes one or more associated predefined benefits or one or more associated predefined detriments; and realizing one or more outcomes for the one or more transactions, wherein an outcome produces a predefined benefit or a predefined detriment for the one or more asset owners according to the amount of participation or the determined class.

52. A computer-program product, tangibly embodied in a machine-readable storage medium, including instructions configured to cause a data processing apparatus to:

assign a right to pledge a portion of one or more assets, wherein the assignment is made to at least one vehicle by one or more asset owners, and wherein each asset owner has the option to have the right to pledge a portion of an asset transferred from a first transaction to a second transaction or from a first vehicle to a second vehicle;

receive one or more rights to pledge a portion of one or more assets, wherein each right to pledge is received by the at least one vehicle from the one or more asset owners, wherein each asset owner can grant at least one right to pledge corresponding to at least one asset, and wherein each right to pledge has one or more associated terms;

pledge a portion of one or more assets to one or more transactions, wherein each transaction can have multiple outcomes;

determine an amount of participation for each asset owner for each transaction, wherein each amount of participation is determined according to either a value of the portion of one or more assets associated with a right to pledge, or a predefined amount of one or more assets associated with a right to pledge;

determine a class for each asset owner for each transaction, wherein each determined class includes one or more associated predefined benefits or one or more associated predefined detriments; and realize one or more outcomes for the one or more transactions, wherein an outcome produces a predefined benefit or a predefined detriment for the one or more asset owners according to the amount of participation or the determined class.

53. A computer-program product, tangibly embodied in a machine-readable storage medium, including instructions configured to cause a data processing apparatus to:

assign a right to pledge one or more assets, wherein the assignment is made to at least one vehicle by one or more asset owners, and wherein each asset owner has the option to have the right to pledge an asset transferred from a first transaction to a second transaction or from a first vehicle to a second vehicle;

receive one or more rights to pledge one or more assets, wherein each right to pledge is received by the at least one vehicle from the one or more asset owners, wherein each asset owner can grant at least one right to pledge corresponding to at least one asset, and wherein each right to pledge has one or more associated terms;

pledge the one or more assets to one or more transactions, wherein each transaction can have multiple outcomes;

determine an amount of participation for each asset owner for each transaction, wherein each amount of participation is determined according to either a value of one or more assets associated with a right to pledge, or a predefined amount of one or more assets associated with a right to pledge;

determine a class for each asset owner for each transaction, wherein each determined class includes one or more associated predefined benefits or one or more associated predefined detriments; and realize one or more outcomes for the one or more transactions, wherein an outcome produces a predefined benefit or a predefined detriment for the one or more asset owners according to the amount of participation or the determined class.

54. The method of claim 1, wherein the one or more received rights is a plurality of rights.

55. The method of claim 1, wherein the one or more assets is a plurality of assets.

56. The method of claim 1, wherein the one or more asset owners is a plurality of asset owners.

57. The method of claim 1, wherein the one or more transactions is a plurality of transactions.

* * * * *